United States Patent
Hara et al.

(10) Patent No.: US 12,491,774 B2
(45) Date of Patent: Dec. 9, 2025

(54) MOTOR CONTROL DEVICE, ELECTROMECHANICAL INTEGRATED UNIT, BOOST CONVERTER SYSTEM, ELECTRIC VEHICLE SYSTEM, AND MOTOR CONTROL METHOD

(71) Applicant: HITACHI ASTEMO, LTD., Hitachinaka (JP)

(72) Inventors: Takafumi Hara, Tokyo (JP); Toshiyuki Ajima, Tokyo (JP); Kyoshiro Itakura, Tokyo (JP); Takeshi Tokuyama, Tokyo (JP); Takahiro Araki, Tokyo (JP); Shigehisa Aoyagi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 276 days.

(21) Appl. No.: 18/266,307

(22) PCT Filed: Sep. 29, 2021

(86) PCT No.: PCT/JP2021/036022
§ 371 (c)(1),
(2) Date: Jun. 9, 2023

(87) PCT Pub. No.: WO2022/130731
PCT Pub. Date: Jun. 23, 2022

(65) Prior Publication Data
US 2024/0042867 A1     Feb. 8, 2024

(30) Foreign Application Priority Data

Dec. 17, 2020  (JP) ................................. 2020-209744

(51) Int. Cl.
*H02P 1/00*     (2006.01)
*B60L 15/00*   (2006.01)
(Continued)

(52) U.S. Cl.
CPC ............. *B60L 15/20* (2013.01); *B60L 15/007* (2013.01); *H02P 27/06* (2013.01); *B60L 2210/40* (2013.01)

(58) Field of Classification Search
CPC .......... B60L 15/20; H02P 23/28; H02P 21/05; H02P 2101/45; H02P 21/22; H02P 27/06; H02P 21/00; H02P 27/28; H02P 27/085
See application file for complete search history.

(56) References Cited

U.S. PATENT DOCUMENTS

| 10,186,984 B1 | 1/2019 | Choi et al. |
| 2019/0207508 A1 | 7/2019 | Tsukamoto et al. |

FOREIGN PATENT DOCUMENTS

| JP | 02-261063 A | 10/1990 |
| JP | 2005-045846 A | 2/2005 |

(Continued)

OTHER PUBLICATIONS

International Search Report of PCT/JP2021/036022 dated Nov. 30, 2021.

(Continued)

*Primary Examiner* — Karen Masih
(74) *Attorney, Agent, or Firm* — MATTINGLY & MALUR, PC

(57) ABSTRACT

A motor control device connected to a power converter that performs power conversion from DC power to AC power and controls driving of an AC motor that is driven by using the AC power includes a voltage command generation unit that generates a three-phase voltage command; and a gate signal generation unit that performs pulse width modulation on the three-phase voltage command and generates a gate signal for controlling an operation of the power converter, in which the voltage command generation unit adjusts the three-phase voltage command by using a zero-phase voltage based on a power factor of the AC power in an overmodulation region in which a modulation factor according to a voltage amplitude ratio between the DC power and the AC power exceeds a predetermined threshold value, and the gate signal generation unit generates the gate signal by performing pulse width modulation on the adjusted three-phase voltage command.

15 Claims, 15 Drawing Sheets

(51) Int. Cl.
*B60L 15/20* (2006.01)
*H02P 27/06* (2006.01)

(56) References Cited

FOREIGN PATENT DOCUMENTS

| | | | |
|---|---|---|---|
| JP | 2008-312398 A | 12/2008 | |
| JP | 2011-024349 A | 2/2011 | |
| JP | 2013-141336 A | 7/2013 | |
| JP | 2015-208116 A | 11/2015 | |
| JP | 2017-103864 A | 6/2017 | |
| JP | 2019-140896 A | 8/2019 | |
| JP | 2019-187121 A | 10/2019 | |
| JP | 2019-187135 A | 10/2019 | |
| JP | 2020-089170 A | 6/2020 | |
| JP | 2020-099114 A | 6/2020 | |
| WO | WO-2008004419 A1 * | 1/2008 | ............ B60L 15/025 |

OTHER PUBLICATIONS

Written Opinion of PCT/JP2021/036022 dated Nov. 30, 2021.
Japanese Office Action received in corresponding Japanese Application No. 2020-209744 dated Jun. 4, 2024.

* cited by examiner (a) TRIANGULAR WAVE CARRIER AND CORRECTED U-PHASE VOLTAGE COMMAND
(b) CORRECTED U-PHASE VOLTAGE COMMAND AND U-PHASE PULSE COMMAND
(c) U-PHASE PULSE COMMAND AND U-PHASE CURRENT (a) PHASE VOLTAGE COMMAND AND ZERO-PHASE VOLTAGE (b) U-PHASE CURRENT AND PULSE COMMAND (c) BATTERY VOLTAGE

MOTOR CONTROL DEVICE, ELECTROMECHANICAL INTEGRATED UNIT, BOOST CONVERTER SYSTEM, ELECTRIC VEHICLE SYSTEM, AND MOTOR CONTROL METHOD

TECHNICAL FIELD

The present invention relates to a motor control device, an electromechanical integrated unit, a boost converter system, an electric vehicle system, and a motor control method.

BACKGROUND ART

A driving inverter used in an electric vehicle or a hybrid vehicle is required to be small and lightweight from the viewpoint of improvement of electric cost, restriction of mounting space, and the like. Components of a general inverter include a power module, a smoothing capacitor, a current sensor, a bus bar wiring that interconnects these, a gate drive board, a control board, and the like.

In the inverter, a total of six power modules including semiconductor elements such as an insulated gate bipolar transistor (IGBT) and a metal-oxide-semiconductor field-effect transistor (MOSFET) are provided, one on each of the positive electrode side (P side) and the negative electrode side (N side) of the U, V, and W phases. These power modules use a DC voltage supplied from a DC power supply such as a high-voltage battery to generate a three-phase AC pulse voltage to be applied to a three-phase motor connected to an inverter. The smoothing capacitor is connected to the power module in parallel with the DC power supply in order to suppress voltage ripples (capacitor voltage ripples) on the DC power supply side generated when the power module generates the three-phase AC pulse voltage.

The capacitor voltage ripple changes depending on the electrostatic capacitance of the smoothing capacitor and the switching frequency of the inverter. Therefore, capacitor voltage ripples can be reduced by increasing the electrostatic capacitance of the smoothing capacitor or increasing the switching frequency of the inverter. However, increasing the electrostatic capacitance of the smoothing capacitor increases the volume (capacitor volume) of the smoothing capacitor, and increasing the switching frequency of the inverter increases the switching loss. Therefore, there is a demand for a technique capable of reducing capacitor voltage ripples while suppressing an increase in capacitor volume and switching loss.

As a related technique of the present invention, a technique described in Patent Literature 1 is known. In order to reduce a neutral point current which is a problem in a series multiplexing inverter, PTL 1 discloses a technique in which three-phase voltage command is divided into six periods of a cycle of an electrical angle of 60 degrees, and the zero-phase voltage command in each period is calculated by a predetermined arithmetic expression and superimposed on the voltage command.

CITATION LIST

Patent Literature

PTL 1: JP H02-261063 A

SUMMARY OF INVENTION

Technical Problem

In the technique described in PTL 1, since the formula used for the calculation of the zero-phase voltage command is complicated, the calculation cost increases. In order to accurately calculate the zero-phase voltage command by dividing the voltage command into six periods, it is necessary to detect the motor rotational position with high accuracy. Furthermore, in the overmodulation region where the modulation factor (ratio of the DC voltage to the AC voltage) exceeds 1.15 ($=\sqrt{(4/3)}$), the zero-phase voltage command cannot be superimposed on the voltage command in the same manner as in the normal time, and thus the output voltage of the inverter cannot be controlled to a desired amplitude or phase. Therefore, it is difficult to adopt the technique of PTL 1 as a means for reducing the capacitor voltage ripple while suppressing an increase in the capacitor volume and the switching loss.

The present invention has been made in view of the above problems, and an object thereof is to effectively reduce the capacitor voltage ripple while suppressing an increase in the capacitor volume and the switching loss.

Solution to Problem

According to the present invention, a motor control device is connected to a power converter that performs power conversion from DC power to AC power and controls driving of an AC motor that is driven by using the AC power, the device includes a voltage command generation unit that generates a three-phase voltage command; and a gate signal generation unit that performs pulse width modulation on the three-phase voltage command and generates a gate signal for controlling an operation of the power converter, in which the voltage command generation unit adjusts the three-phase voltage command by using a zero-phase voltage based on a power factor of the AC power in an overmodulation region in which a modulation factor according to a voltage amplitude ratio between the DC power and the AC power exceeds a predetermined threshold value, and the gate signal generation unit generates the gate signal by performing pulse width modulation on the adjusted three-phase voltage command by the voltage command generation unit.

According to the present invention, an electromechanical integrated unit includes a motor control device; the power converter that is connected to the motor control device; the AC motor that is driven by the power converter; and a gear that transmits a rotational driving force of the AC motor, in which the AC motor, the power converter, and the gear are integrated.

According to the present invention, a boost converter system includes a motor control device; the power converter that is connected to the motor control device; the AC motor that is driven by the power converter; and a boost converter that boosts a voltage of the DC power.

According to the present invention, an electric vehicle system includes a motor control device; the power converter that is connected to the motor control device; and the AC motor that is driven by the power converter, and travels by using a rotational driving force of the AC motor.

According to the present invention, a motor control method is a method for controlling an operation of a power converter that performs power conversion from DC power to AC power and controlling driving of an AC motor that is driven by using the AC power, the method including: generating a voltage command; adjusting the voltage command by using a zero-phase voltage based on a power factor of the AC power in an overmodulation region in which a modulation factor according to a voltage amplitude ratio between the DC power and the AC power exceeds a predetermined threshold value; and performing pulse width modulation on the adjusted voltage command to generate a gate signal for controlling the operation of the power converter.

Advantageous Effects of Invention

According to the present invention, it is possible to effectively reduce capacitor voltage ripples while suppressing an increase in capacitor volume and switching loss.

DESCRIPTION OF EMBODIMENTS

First Embodiment

Hereinafter, a first embodiment of the present invention is described with reference to the drawings.

Figure 1:
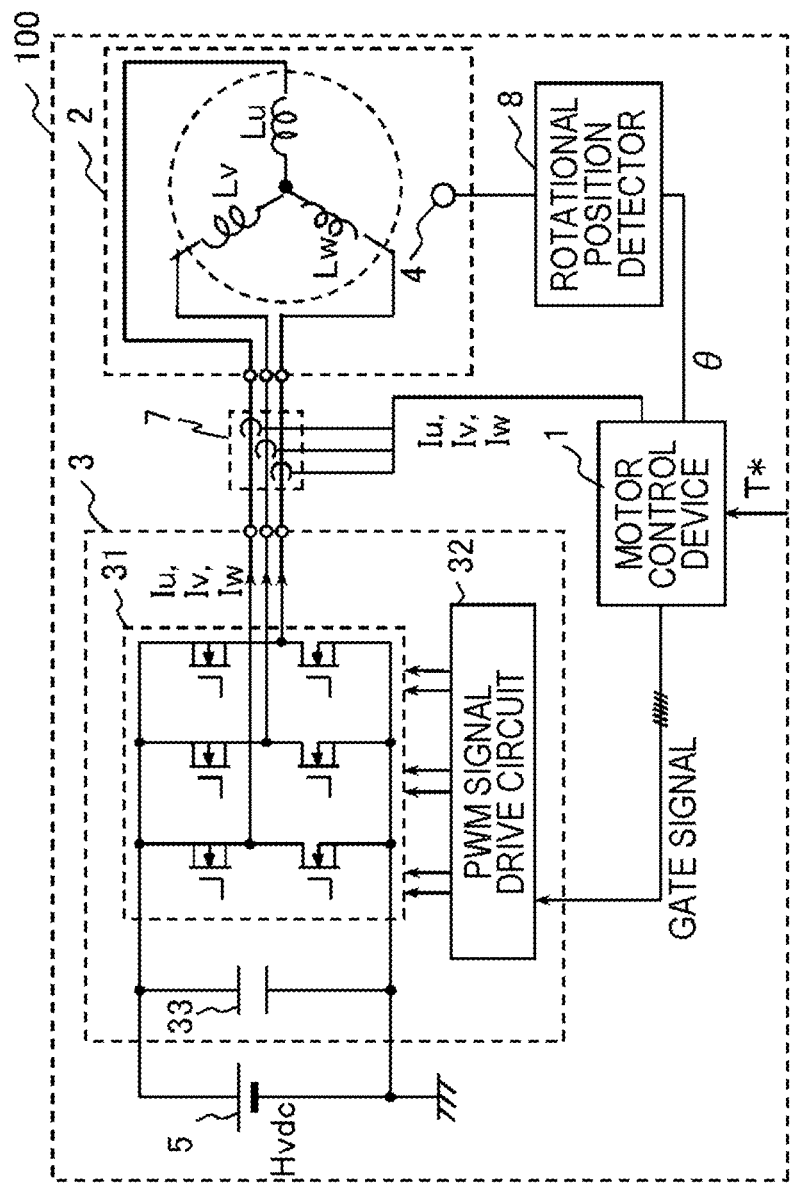
FIG. 1 is an overall configuration diagram of a motor drive system including a motor control device according to a first embodiment of the present invention.

FIG. 1 is an overall configuration diagram of a motor drive system including a motor control device according to the first embodiment of the present invention. In FIG. 1, a motor drive system 100 of the present embodiment includes a motor control device 1, a motor 2, an inverter 3, a high-voltage battery 5, a current detection unit 7, and a rotational position detector 8.

A rotational position θ of the motor 2 is input from the rotational position detector 8 to the motor control device 1. In addition, Iu, Iv, and Iw representing three-phase AC currents flowing through the motor 2 are input from the current detection unit 7, and a torque command T* is input from a host control device (not illustrated). The motor control device 1 generates a gate signal for controlling driving of the motor 2 based on the input information and outputs the gate signal to the inverter 3. Thus, the operation of the inverter 3 is controlled, and the driving of the motor 2 is controlled. Details of the motor control device 1 are described below.

The inverter 3 includes an inverter circuit 31, a PWM signal drive circuit 32, and a smoothing capacitor 33. The PWM signal drive circuit 32 generates a PWM signal for controlling each switching element included in the inverter circuit 31 based on the gate signal input from the motor control device 1 and outputs the PWM signal to the inverter circuit 31. The inverter circuit 31 includes switching elements respectively corresponding to the upper arm and the lower arm of the U phase, the V phase, and the W phase. By controlling each of these switching elements according to the PWM signal input from the PWM signal drive circuit 32, the DC power supplied from the high-voltage battery 5 is converted into AC power and output to the motor 2. The smoothing capacitor 33 smooths the DC power supplied from the high-voltage battery 5 to the inverter circuit 31.

The high-voltage battery 5 is a DC voltage source of the motor drive system 100 and outputs a power supply voltage Hvdc to the inverter 3. The power supply voltage Hvdc of the high-voltage battery 5 is converted into a pulse-shaped three-phase AC voltage having a variable voltage and a variable frequency by the inverter circuit 31 and the PWM signal drive circuit 32 of the inverter 3 and is applied to the motor 2 as a line voltage. As a result, the AC power is supplied from the inverter 3 to the motor 2 based on the DC power of the high-voltage battery 5. Note that the power supply voltage Hvdc of the high-voltage battery 5 varies depending on the charging state of thereof.

The motor 2 is a three-phase motor rotationally driven by AC power supplied from the inverter 3 and includes a stator and a rotor. In the present embodiment, an example in which a permanent magnet synchronous motor is used as the motor 2 is described, but another type of the motor 2 such as an induction motor or a synchronous reluctance motor may be used. When the AC power input from the inverter 3 is applied to three-phase coils Lu, Lv, and Lw provided in the stator, the three-phase AC currents Iu, Iv, and Iw are conducted in the motor 2, and a magnetic flux is generated in each coil. When attractive force and repulsive force are generated between the magnetic flux of each coil and the magnetic flux of the permanent magnet disposed in the rotor, torque is generated in the rotor, and the motor 2 is rotationally driven.

A rotational position sensor 4 for detecting the rotational position θ of the rotor is attached to the motor 2. The rotational position detector 8 calculates a rotational position θ from an input signal of the rotational position sensor 4. The calculation result of the rotational position θ by the rotational position detector 8 is input to the motor control device 1 and is used in the phase control of the AC power performed by the motor control device 1 generating a pulse-shaped gate signal in accordance with the phase of the induced voltage of the motor 2.

Here, a resolver including an iron core and a winding is more suitable as the rotational position sensor 4, but a sensor using a magnetoresistive element such as a GMR sensor or a Hall element has no problem. Any sensor can be used as the rotational position sensor 4 as long as the magnetic pole position of the rotor can be measured. Further, the rotational position detector 8 may estimate the rotational position θ by using the three-phase AC currents Iu, Iv, and Iw flowing through the motor 2 and three-phase AC voltages Vu, Vv, and Vw applied from the inverter 3 to the motor 2 without using the input signal from the rotational position sensor 4.

The current detection unit 7 is disposed in a current path between the inverter 3 and the motor 2. The current detection unit 7 detects the three-phase AC currents Iu, Iv, and Iw (the U-phase AC current Iu, the V-phase AC current Iv, and the W-phase AC current Iw) that energize the motor 2. The current detection unit 7 is configured by using, for example, a Hall current sensor or the like. Detection results of the three-phase AC currents Iu, Iv, and Iw by the current detection unit 7 are input to the motor control device 1 and are used for generation of a gate signal performed by the motor control device 1. Although FIG. 1 illustrates an example in which the current detection unit 7 includes three current detectors, two current detectors may be provided, and the AC current of the remaining one phase may be calculated from the fact that the sum of the three-phase AC currents Iu, Iv, and Iw is zero. The pulse-shaped DC current flowing from the high-voltage battery 5 into the inverter 3 may be detected by a shunt resistor or the like inserted between the smoothing capacitor 33 and the inverter 3, and the three-phase AC currents Iu, Iv, and Iw may be obtained based on the DC current and the three-phase AC voltages Vu, Vv, and Vw applied from the inverter 3 to the motor 2.

Figure 2:
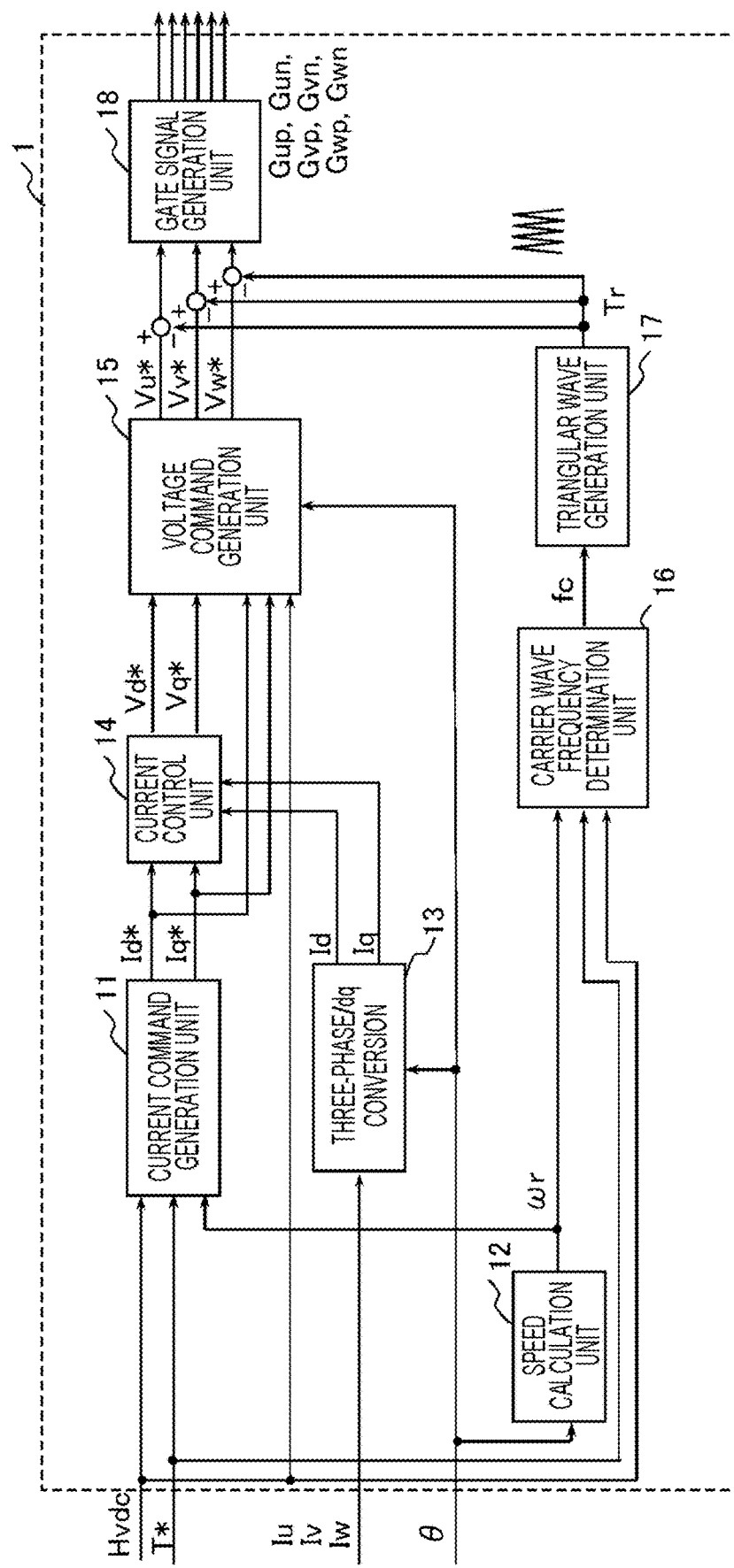
FIG. 2 is a block diagram illustrating a functional configuration of the motor control device according to the first embodiment of the present invention.

Next, details of the motor control device 1 is described. FIG. 2 is a block diagram illustrating a functional configuration of the motor control device 1 according to the first embodiment of the present invention.

As illustrated in FIG. 2, the motor control device 1 includes functional blocks of a current command generation unit 11, a speed calculation unit 12, a three-phase/dq conversion unit 13, a current control unit 14, a voltage command generation unit 15, a carrier wave frequency determination unit 16, a triangular wave generation unit 17, and a gate signal generation unit 18. The motor control device 1 includes, for example, a microcomputer and can realize these functional blocks by executing a predetermined program in the microcomputer. Alternatively, some or all of these functional blocks may be realized by using a hardware circuit such as a logic IC or an FPGA.

The current command generation unit 11 calculates a d-axis current command Id* and a q-axis current command Iq* based on the input torque command T* and the power supply voltage Hvdc. Here, for example, the d-axis current command Id* and the q-axis current command Iq* according to the torque command T* are obtained by using a preset current command map, a mathematical expression representing the relationship between the d-axis current Id and the q-axis current Iq and the motor torque, or the like.

The speed calculation unit 12 calculates a motor rotational speed ωr representing the rotational speed (rotation number) of the motor 2 from the temporal change of the rotational position θ. The motor rotational speed ωr may be a value represented by either an angular speed (rad/s) or a rotation number (rpm). In addition, these values may be mutually converted and used.

The three-phase/dq conversion unit 13 performs dq conversion based on the rotational position θ obtained by the rotational position detector 8 on the three-phase AC currents Iu, Iv, and Iw detected by the current detection unit 7 and calculates a d-axis current value Id and a q-axis current value Iq.

The current control unit 14 calculates a d-axis voltage command Vd* and a q-axis voltage command Vq* according to the torque command T* based on deviations between the d-axis current command Id* and the q-axis current command Iq* output from the current command generation unit 11 and the d-axis current value Id and the q-axis current value Iq output from the three-phase/dq conversion unit 13 so that these values match with each other. Here, for example, by a control method such as PI control, the d-axis voltage command Vd* according to the deviation between the d-axis current command Id* and the d-axis current value Id and the q-axis voltage command Vq* according to the deviation between the q-axis current command Iq* and the q-axis current value Iq are obtained.

The voltage command generation unit 15 calculates and outputs three-phase voltage commands Vu*, Vv*, and Vw* (a U-phase voltage command value Vu*, a V-phase voltage command value Vv*, and a W-phase voltage command value Vw*) based on the d-axis current command Id* and the q-axis current command Iq* output from the current command generation unit 11, the d-axis voltage command Vd* and the q-axis voltage command Vq* calculated by the current control unit 14, the rotational position θ obtained by the rotational position detector 8, and the power supply voltage Hvdc. Details of a method of calculating the three-phase voltage commands Vu*, Vv*, and Vw* by the voltage command generation unit 15 are described below.

The carrier wave frequency determination unit 16 determines a carrier wave frequency fc representing the frequency of the carrier wave used to generate the gate signal based on the rotational speed ωr obtained by the speed calculation unit 12, the torque command T*, and the power supply voltage Hvdc. For example, the carrier wave frequency fc is determined so that the number of synchronous PWM carrier waves Nc representing the number of carrier waves for one cycle of the voltage waveform in the synchronous PWM control is a predetermined integer. Here, the number of synchronous PWM carrier waves Nc can be set as, for example, a number that satisfies the conditional expression of Nc=3×(2×n−1) among multiples of 3. In this conditional expression, n represents any natural number, and for example, n=1 (Nc=3), n=2 (Nc=9), n=3 (Nc=15), or the like can be selected.

The triangular wave generation unit 17 generates triangular wave signal (carrier wave signal) Tr for each of three-phase voltage commands Vu*, Vv*, and Vw* based on carrier wave frequency fc determined by the carrier wave frequency determination unit 16.

The gate signal generation unit 18 performs pulse width modulation on each of the three-phase voltage commands Vu*, Vv*, and Vw* output from the voltage command generation unit 15 by using the triangular wave signal Tr output from the triangular wave generation unit 17 and generates a gate signal for controlling the operation of the inverter 3. Specifically, based on a comparison result between the three-phase voltage commands Vu*, Vv*, and Vw* output from the voltage command generation unit 15 and the triangular wave signal Tr output from the triangular wave generation unit 17, a pulse-shaped voltage is generated for each phase of the U phase, the V phase, and the W phase. Then, a pulse-shaped gate signal for the switching element of each phase of the inverter 3 is generated based on the generated pulse-shaped voltage. At this time, gate signals Gup, Gvp, and Gwp of the upper arms of the respective phases are logically inverted to generate gate signals Gun, Gvn, and Gwn of the lower arms. The gate signal generated by the gate signal generation unit 18 is output from the motor control device 1 to the PWM signal drive circuit 32 of the inverter 3 and is converted into a PWM signal by the PWM signal drive circuit 32. As a result, each switching element of the inverter circuit 31 is controlled to be turned on/off, and the output voltage of the inverter 3 is adjusted.

Next, details of the voltage command generation unit 15, which is a feature of the present embodiment, are described.

Figure 3:
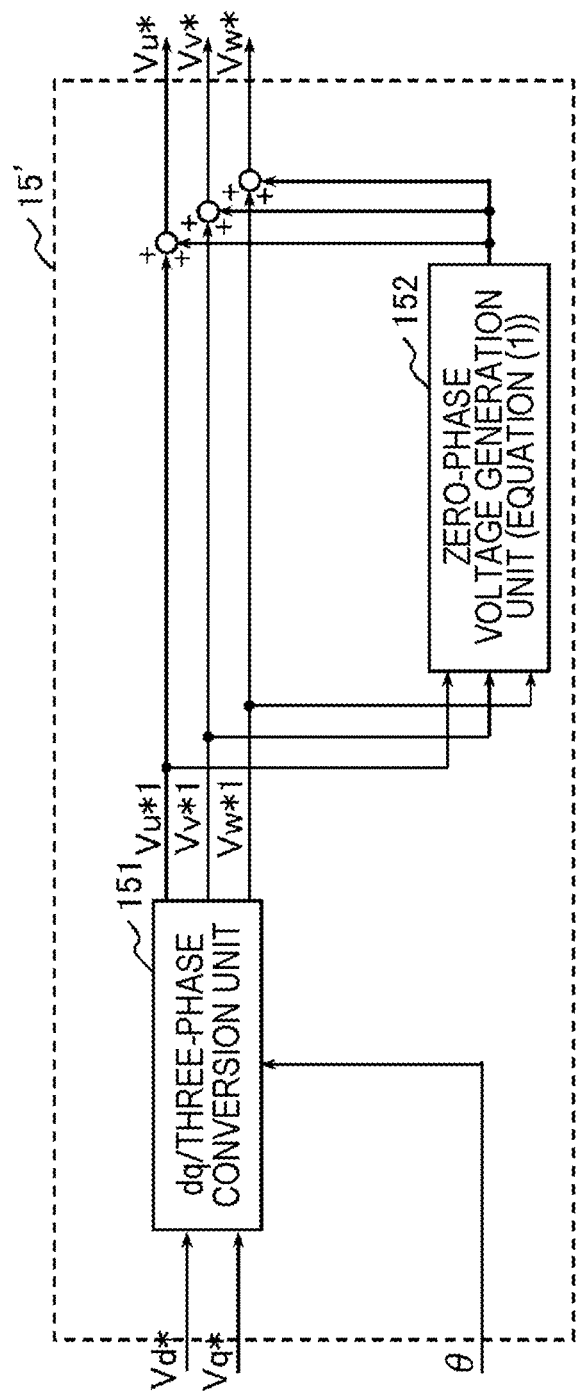
FIG. 3 is a block diagram of a voltage command generation unit adopting a voltage command generation method in the related art.

First, before describing the voltage command generation unit 15, a voltage command generation method in the related art is described. FIG. 3 is a block diagram of a voltage command generation unit 15' adopting a voltage command generation method in the related art. As illustrated in FIG. 3, the voltage command generation unit 15' includes a dq/three-phase conversion unit 151 and a zero-phase voltage generation unit 152.

The dq/three-phase conversion unit 151 generates a three-phase voltage command before the zero-phase voltage is superimposed based on the d-axis voltage command Vd*, the q-axis voltage command Vq*, and the rotational position θ. Specifically, three-phase conversion based on the rotational position θ is performed on the d-axis voltage command Vd* and the q-axis voltage command Vq* to calculate first three-phase voltage commands Vu*1, Vv*1, and Vw*1 as the three-phase voltage commands before the zero-phase voltage superimposition.

The zero-phase voltage generation unit 152 generates zero-phase voltages for the first three-phase voltage commands Vu*1, Vv*1, and Vw*1 generated by the dq/three-phase conversion unit 151. When the inverter 3 outputs the AC power according to the first three-phase voltage commands Vu*1, Vv*1, and Vw*l, the zero-phase voltage generated by the zero-phase voltage generation unit 152 corresponds to a voltage obtained by inverting the polarity of the voltage generated at the neutral point of the motor 2, that is, the connection point of three-phase coils Lu, Lv, and Lw by the AC power and is obtained by the Equation (1) below.

Zero-Phase Voltage=−(Maximum Phase Voltage+ Minimum Phase Voltage)/2         (1)

In Equation (1) above, the maximum phase voltage represents one having the maximum amplitude (absolute value) of the first three-phase voltage commands Vu*1, Vv*1, and Vw*1 output from the dq/three-phase conversion unit 151. In addition, the minimum phase voltage represents one having the smallest amplitude (absolute value) among the first three-phase voltage commands Vu*1, Vv*1, and Vw*1 output from the dq/three-phase conversion unit 151. That is, the zero-phase voltage generation unit 152 can generate the zero-phase voltage based on the average value of the maximum phase voltage command and the minimum phase voltage command among the first three-phase voltage commands Vu*1, Vv*1, and Vw*1 by Equation (1).

The zero-phase voltage generated by the zero-phase voltage generation unit 152 is superimposed on each of the first three-phase voltage commands Vu*1, Vv*1, and Vw*1 generated by the dq/three-phase conversion unit 151. As a result, three-phase voltage commands Vu*, Vv*, and Vw* after the zero-phase voltage superimposition are calculated and output from the voltage command generation unit 15'.

In the voltage command generation method of the related art, as described above, the three-phase voltage commands Vu*, Vv*, and Vw* in which the zero-phase voltages are superimposed on the first three-phase voltage commands Vu*1, Vv*1, and Vw*1 are generated by the voltage command generation unit 15'. Thus, the capacitor voltage ripple generated in the smoothing capacitor 33 is suppressed.

Figure 4:
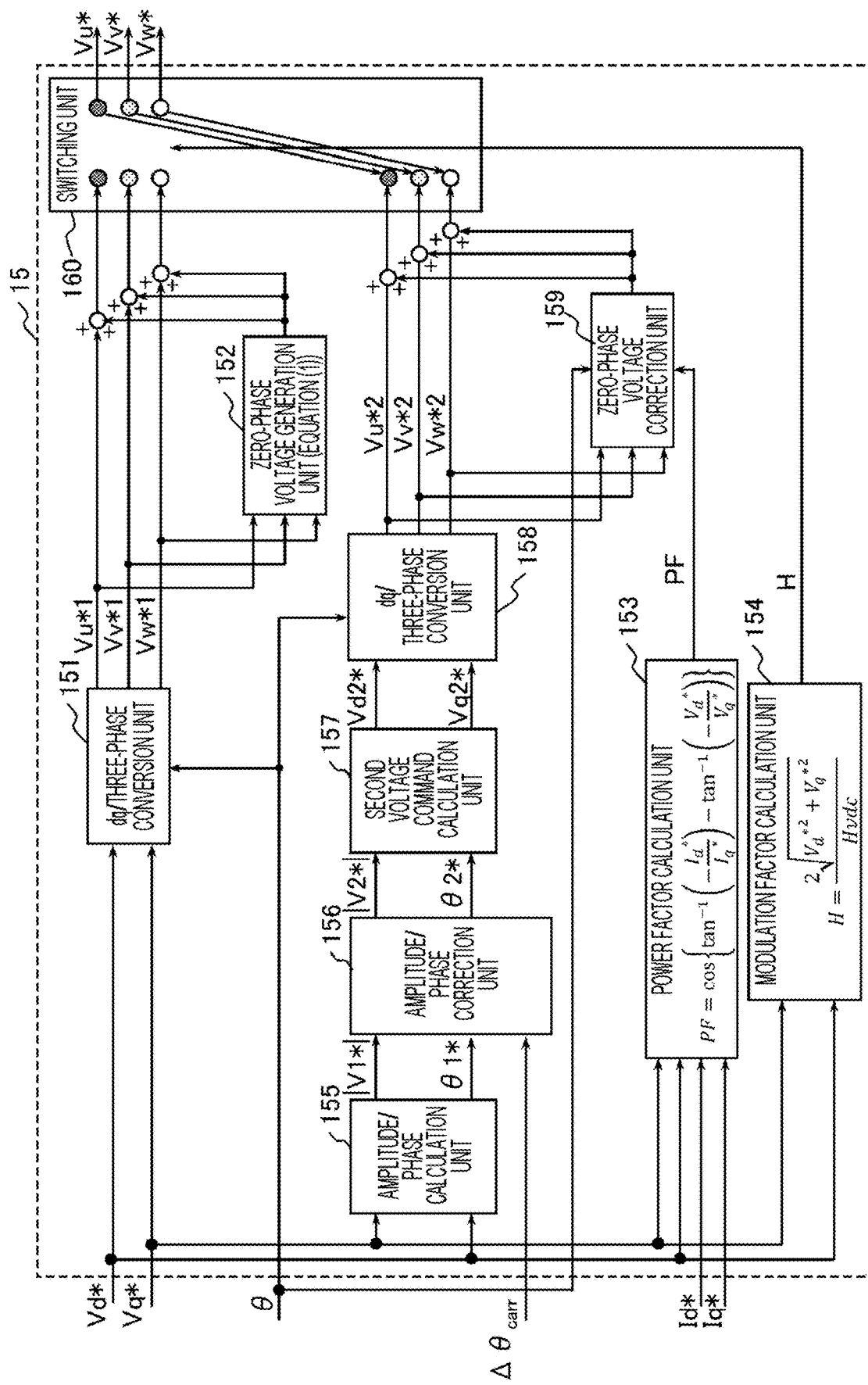
FIG. 4 is a block diagram of a voltage command generation unit according to the first embodiment of the present invention.

Subsequently, the voltage command generation unit 15 according to the present embodiment is described. FIG. 4 is a block diagram of the voltage command generation unit 15 according to the first embodiment of the present invention. As illustrated in FIG. 4, the voltage command generation unit 15 includes the dq/three-phase conversion unit 151, the zero-phase voltage generation unit 152, a power factor calculation unit 153, a modulation factor calculation unit 154, an amplitude/phase calculation unit 155, an amplitude/phase correction unit 156, a second voltage command calculation unit 157, a dq/three-phase conversion unit 158, a zero-phase voltage correction unit 159, and a switching unit 160. Note that the dq/three-phase conversion unit 151 and the zero-phase voltage generation unit 152 are the same as those included in the voltage command generation unit 15' of the example in the related art illustrated in FIG. 3.

The power factor calculation unit 153 calculates a power factor of the AC power output from the inverter 3. Here, in order to add the zero-phase voltage according to the power factor to the voltage command in the voltage command generation unit 15, a power factor PF is calculated by using Equation (2) below.

$$PF = \cos\{a\tan(-Id^*/Iq^*) - a\tan(-Vd^*/Vq^*)\} \quad (2)$$

The modulation factor calculation unit 154 calculates a modulation factor H by using Equation (3) below based on the d-axis voltage command Vd* and the q-axis voltage command Vq* and the power supply voltage Hvdc of the high-voltage battery 5.

$$H = 2\sqrt{(Vd^{*2} + Vq^{*2})}/Hvdc \quad (3)$$

The amplitude/phase calculation unit 155 calculates a first voltage amplitude |V1*| and a first voltage phase θ1* from the d-axis voltage command Vd* and the q-axis voltage command Vq* by Equations (4) and (5) below, respectively.

$$|V1^*| = \sqrt{(Vd^{*2} + Vq^{*2})} \quad (4)$$

$$\theta 1^* = a\tan(Vd^*/-Vq^*) \quad (5)$$

The amplitude/phase correction unit 156 corrects the first voltage amplitude |V1*| and the first voltage phase θ1* calculated by the amplitude/phase calculation unit 155 to calculate a second voltage amplitude |V2*| and a second voltage phase θ2*. For example, a relationship between the first voltage amplitude |V1*| and the second voltage amplitude |V2*| set according to a predetermined condition and a relationship between the first voltage phase θ1* and the second voltage phase θ2* are created in advance as correction map information and stored in the amplitude/phase correction unit 156. Then, the first voltage amplitude |V1*| and the first voltage phase θ1* are acquired from the amplitude/phase calculation unit 155, and the second voltage amplitude |V2*| and the second voltage phase θ2* can be calculated by map searching the correction map information stored in advance based on these values.

Note that the relationship between the first voltage amplitude |V1*| and the second voltage amplitude |V2*| and the relationship between the first voltage phase θ1* and the second voltage phase θ2* in the correction map information can be set based on a phase difference (carrier wave phase difference) Δθcarr between a reference voltage phase θvb, which is a reference value of the phase of the carrier wave in the synchronous PWM control, and the triangular wave signal Tr output as the carrier wave from the triangular wave generation unit 17. The carrier wave phase difference Δθcarr corresponds to the phase of the triangular wave signal Tr in the synchronous PWM control and is determined according to the rotational speed ωr, the torque command T*, and the modulation factor H. Therefore, for example, in the amplitude/phase correction unit 156, correction map information created for various values of the carrier wave phase difference Δθcarr is stored in advance. Then, the rotational speed ωr, the torque command T*, and the modulation factor H are acquired, the correction map information is selected according to the value of the carrier wave phase difference Δθcarr determined based on these values, and the second voltage amplitude |V2*| and the second voltage phase θ2* can be calculated.

The second voltage command calculation unit 157 calculates a second d-axis voltage command Vd2* and a second q-axis voltage command Vq2* based on the second voltage amplitude |V2*| and the second voltage phase θ2* calculated by the amplitude/phase correction unit 156. Here, the second d-axis voltage command Vd2* and the second q-axis voltage command Vq2* are calculated by Equations (6) and (7), respectively.

$$Vd2^* = -|V2^*|\sin\theta2^* \quad (6)$$

$$Vq2^* = |V2^*|\cos\theta2^* \quad (7)$$

The dq/three-phase conversion unit 158 generates a three-phase voltage command before the zero-phase voltage is superimposed based on the second d-axis voltage command Vd2* and the second q-axis voltage command Vq2* calculated by the second voltage command calculation unit 157 and the rotational position θ. Here, similarly to the dq/three-phase conversion unit 151, three-phase conversion based on the rotational position θ is performed on the second d-axis voltage command Vd2* and the second q-axis voltage command Vq2*, whereby second three-phase voltage commands Vu*2, Vv*2, and Vw*2 are calculated as the three-phase voltage commands before the zero-phase voltage superimposition.

The zero-phase voltage correction unit 159 generates a zero-phase voltage V0 for the second three-phase voltage commands Vu*2, Vv*2, and Vw*2 generated by the dq/three-phase conversion unit 158. The zero-phase voltage V0 generated by the zero-phase voltage correction unit 159 corresponds to a voltage obtained by delaying the third harmonic components of the second three-phase voltage commands Vu*2, Vv*2, and Vw*2 by a phase corresponding to the power factor PF calculated by the power factor calculation unit 153 and is obtained by Equation (8) below.

$$V0 = A0 \sin(3\theta - a\cos(PF)) \quad (8)$$

In Equation (8) above, a value set in advance in the zero-phase voltage correction unit 159 can be used as an amplitude A0. This may be derived in advance using, for example, circuit simulation or may be determined using an actual machine of the motor 2 or the inverter 3.

The zero-phase voltage V0 generated by the zero-phase voltage correction unit 159 is superimposed on each of the second three-phase voltage commands Vu*2, Vv*2, and Vw*2 generated by the dq/three-phase conversion unit 158.

The switching unit 160 switches the three-phase voltage commands Vu*, Vv*, and Vw* based on the modulation factor H calculated by the modulation factor calculation unit 154. Here, the modulation factor H is compared with a predetermined threshold value, and the three-phase voltage commands Vu*, Vv*, and Vw* are switched according to the comparison result. Specifically, when the modulation factor H is less than the threshold value, the switching state of the switching unit 160 is controlled so that voltages obtained by superimposing the zero-phase voltages generated by the zero-phase voltage generation unit 152 on first three-phase voltage commands Vu*1, Vv*1, and Vw*1 generated by the dq/three-phase conversion unit 151, respectively are output as the three-phase voltage commands Vu*, Vv*, and Vw* by the voltage command generation unit 15. On the other hand, when the modulation factor H is the threshold value or more, the switching state of the switching unit 160 is controlled so that voltages obtained by superimposing the zero-phase voltage V0 generated by the zero-phase voltage correction unit 159 on the second three-phase voltage commands Vu*2, Vv*2, and Vw*2 generated by the dq/three-phase conversion unit 158 are output as the three-phase voltage commands Vu*, Vv*, and Vw* by the voltage command generation unit 15. At this time, a rate may be given to changes in the three-phase voltage commands Vu*, Vv*, and Vw*, or hysteresis may be provided so that the switching shock does not occur before and after the threshold value.

In the voltage command generation unit 15 of the present embodiment, the three-phase voltage commands Vu*, Vv*, and Vw* adjusted by using the zero-phase voltage by the method in the related art and the three-phase voltage commands Vu*, Vv*, and Vw* adjusted by using the zero-phase voltage V0 based on the power factor can be mutually switched according to the value of the modulation factor H of the AC power output from the inverter 3 by the switching operation of the switching unit 160 as described above.

Note that, as the threshold value of the modulation factor H in the switching unit 160, any value such as a modulation factor 1.15 (=√(4/3)) which is a switching point between sine wave modulation and overmodulation control can be set in advance. Generally, in the NT characteristic in which the relationship between the torque of the motor and the rotation number is indicated by a curve, a region where the modulation factor is larger than 1.15 corresponds to a high-speed rotation/high-torque region. When the threshold value of the modulation factor H in the switching unit 160 is set to 1.15, the three-phase voltage commands Vu*, Vv*, and Vw* can be adjusted by using the zero-phase voltage V0 based on the power factor in the high-speed rotation/high-torque region, and thus the effect of reducing the capacitor voltage ripples is large. However, by setting the threshold value of the modulation factor H to less than 1.15, it is also possible to superimpose the zero-phase voltage corresponding to the power factor on the three-phase voltage commands Vu*, Vv*, and Vw* in the region where the modulation factor is less than 1.15 and reduce the capacitor voltage ripple.

As described above, the voltage command generation unit 15 according to the present embodiment generates the three-phase voltage commands Vu*, Vv*, and Vw* on which the zero-phase voltages are superimposed and outputs the generated commands to the gate signal generation unit 18. The gate signal generation unit 18 generates the gate signals Gup, Gvp, and Gwp of the upper arm and the gate signals Gun, Gvn, and Gwn of the lower arm by performing pulse width modulation on the three-phase voltage commands Vu*, Vv*, and Vw*, respectively. As a result, it is possible to reduce ripples of the DC current flowing from the high-voltage battery 5 to the inverter 3 according to the switching timing of each phase, and thus it is possible to reduce capacitor voltage ripples. Note that ripples of the DC current are determined by Equation (9) below according to the gate signals Gup, Gvp, and Gwp of the respective phases and the three-phase currents Iu, Iv, and Iw.

$$Idc = Gup*Iu + Gvp*Iv + Gwp*Iw \quad (9)$$

In the motor control device 1 of the present embodiment, the voltage command generation unit 15 is configured as described above, so that a desired voltage command and a desired voltage phase can be obtained even at the time of overmodulation with a modulation factor exceeding 1.15. Therefore, the torque can be stably output in the motor 2.

Next, the reason that the ripples of the DC current can be reduced by changing the zero-phase voltage V0 by the power factor PF as in Equation (8) is described below with reference to FIGS. 5 to 8.

Figure 5:
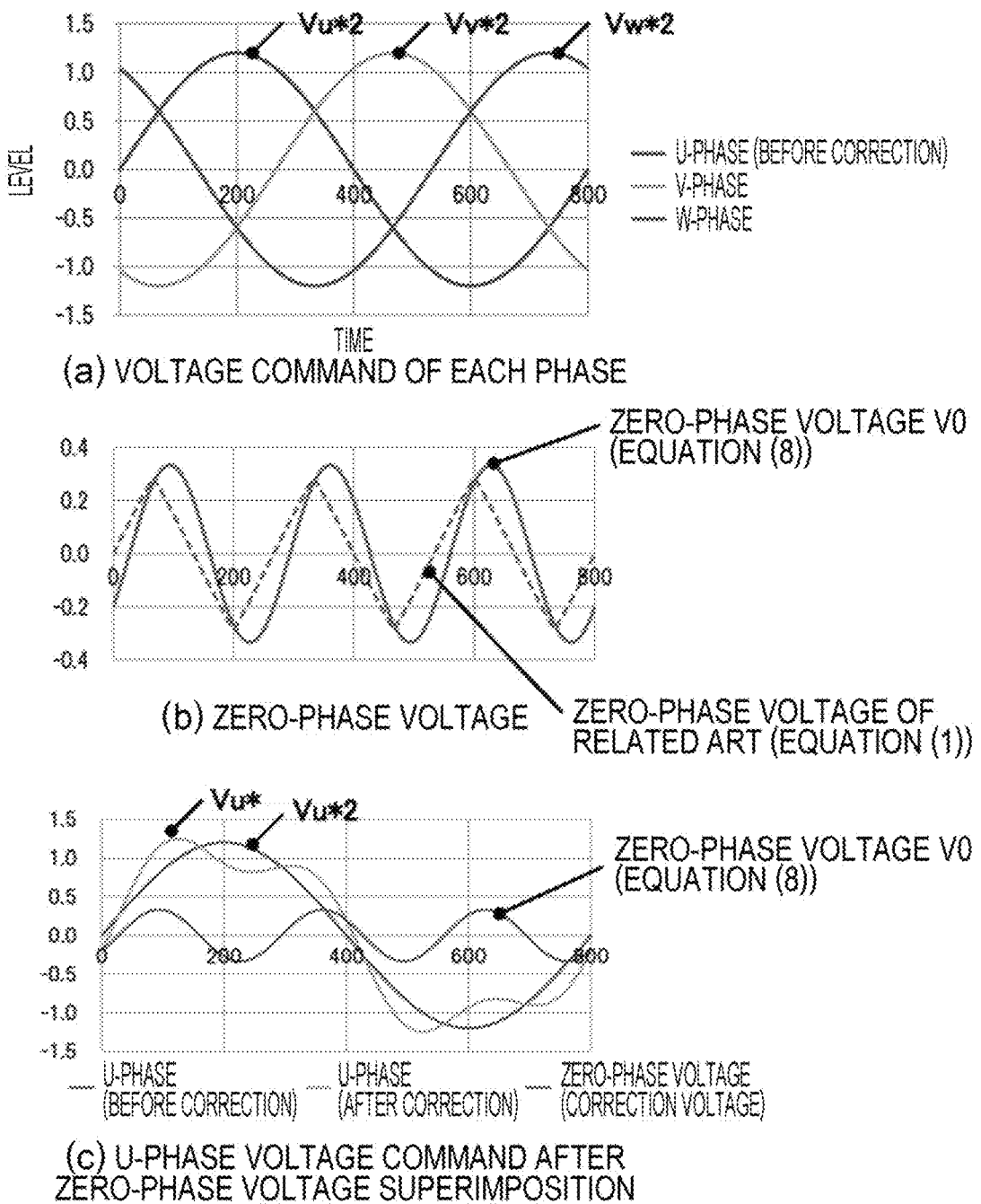
FIG. 5 is a diagram illustrating a change in a voltage command before and after superimposition of a zero-phase voltage.

FIG. 5 is a diagram illustrating a change in a voltage command before and after superimposition of a zero-phase voltage. In FIG. 5, (a) illustrates the voltage commands of the respective phases before the zero-phase voltage superimposition, that is, the second three-phase voltage commands Vu*2, Vv*2, and Vw*2, (b) illustrates the zero-phase voltage V0 generated by the zero-phase voltage correction unit 159, and (c) illustrates the U-phase voltage command Vu* after the zero-phase voltage superimposition.

The voltage command generation unit 15 adds, for example, the zero-phase voltage V0 as illustrated in FIG. to the second U-phase voltage command Vu*2 among the second three-phase voltage commands Vu*2, Vv*2, and Vw*2 illustrated in FIG. 5(*a*). The zero-phase voltage V0 corresponds to a third harmonic component of the amplitude A0 whose phase is delayed by the power factor PF from the second U-phase voltage command Vu*2. As a result, the U-phase voltage command Vu* as illustrated in FIG. 5(*c*) is generated and output from the voltage command generation unit 15. FIGS. 5(*b*) and 5(*c*) illustrate the zero-phase voltage V0 superimposed on the second U-phase voltage command Vu*2 and the U-phase voltage command Vu* generated by the zero-phase voltage V0. Similarly for the second V-phase voltage command Vv*2 and the second W-phase voltage command Vw*2, the zero-phase voltage V0, which is the third harmonic component of the amplitude A0 whose phase is delayed by the power factor PF, is superimposed and output as the V-phase voltage command Vv*and the W-phase voltage command Vw*.

Figure 6:
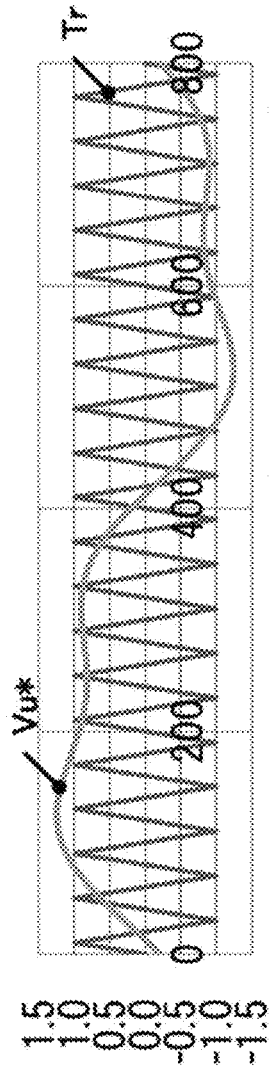
FIG. 6 is a diagram illustrating a relationship between signals in the motor control device according to the first embodiment of the present invention.
Figure 6:
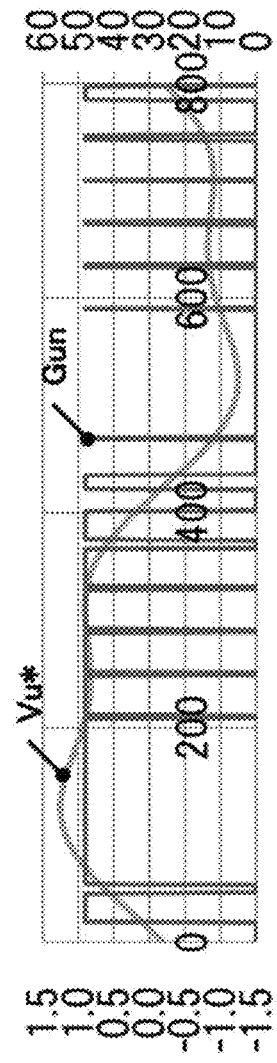
Figure 6:
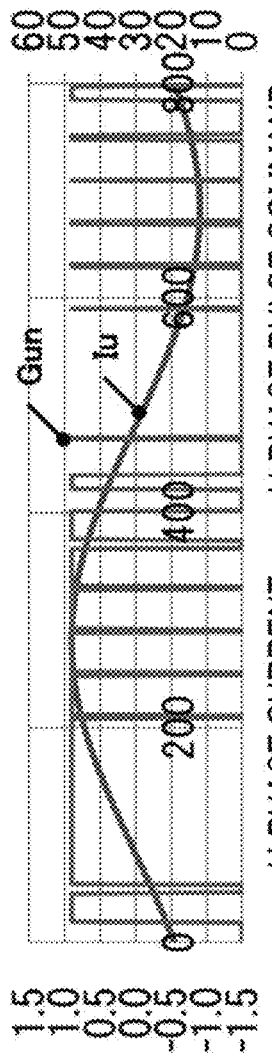

FIG. 6 is a diagram illustrating a relationship between signals in the motor control device 1 according to the first embodiment of the present invention. In FIG. 6, (a) illustrates a relationship between the triangular wave carrier (triangular wave signal Tr) and the corrected U-phase voltage command Vu* by superimposition of the zero-phase voltage V0, (b) illustrates a relationship between the corrected U-phase voltage command Vu* and the U-phase pulse command (the gate signal Gun), and (c) illustrates a relationship between the U-phase pulse command (the gate signal Gun) and the U-phase current Iu.

As illustrated in FIG. 6(*a*), the voltage command generation unit 15 compares the corrected U-phase voltage command Vu* with the triangular wave carrier to generate the U-phase pulse command illustrated in FIG. 6(*b*). In response to the U-phase pulse command, the U-phase current Iu approximated by a sine wave illustrated in FIG. 6(*c*) flows. Here, focusing on the U-phase pulse command and the U-phase current Iu in FIG. 6(*c*), it can be seen that a large number of pulse waveforms are included in the U-phase pulse command near the peak of the U-phase current Iu. FIG. 6(*c*) illustrates the relationship between the U-phase pulse command and the U-phase current Iu. Similarly for the V-phase and the W-phase, a large number of pulse waveforms are included in the V-phase pulse command and the W-phase pulse command near the peaks of the V-phase current Iv and the W-phase current Iw, respectively.

As described above, in the motor control device 1 of the present embodiment, in the high-speed rotation/high-torque region where the modulation factor is 1.15 or more, the pulses can be intensively marked near the peaks of the three-phase currents Iu, Iv, and Iw. Therefore, the ripple component of a DC current Idc is reduced by Equation (9) above, and thus reduction of the capacitor voltage ripple can be expected.

Figure 7:
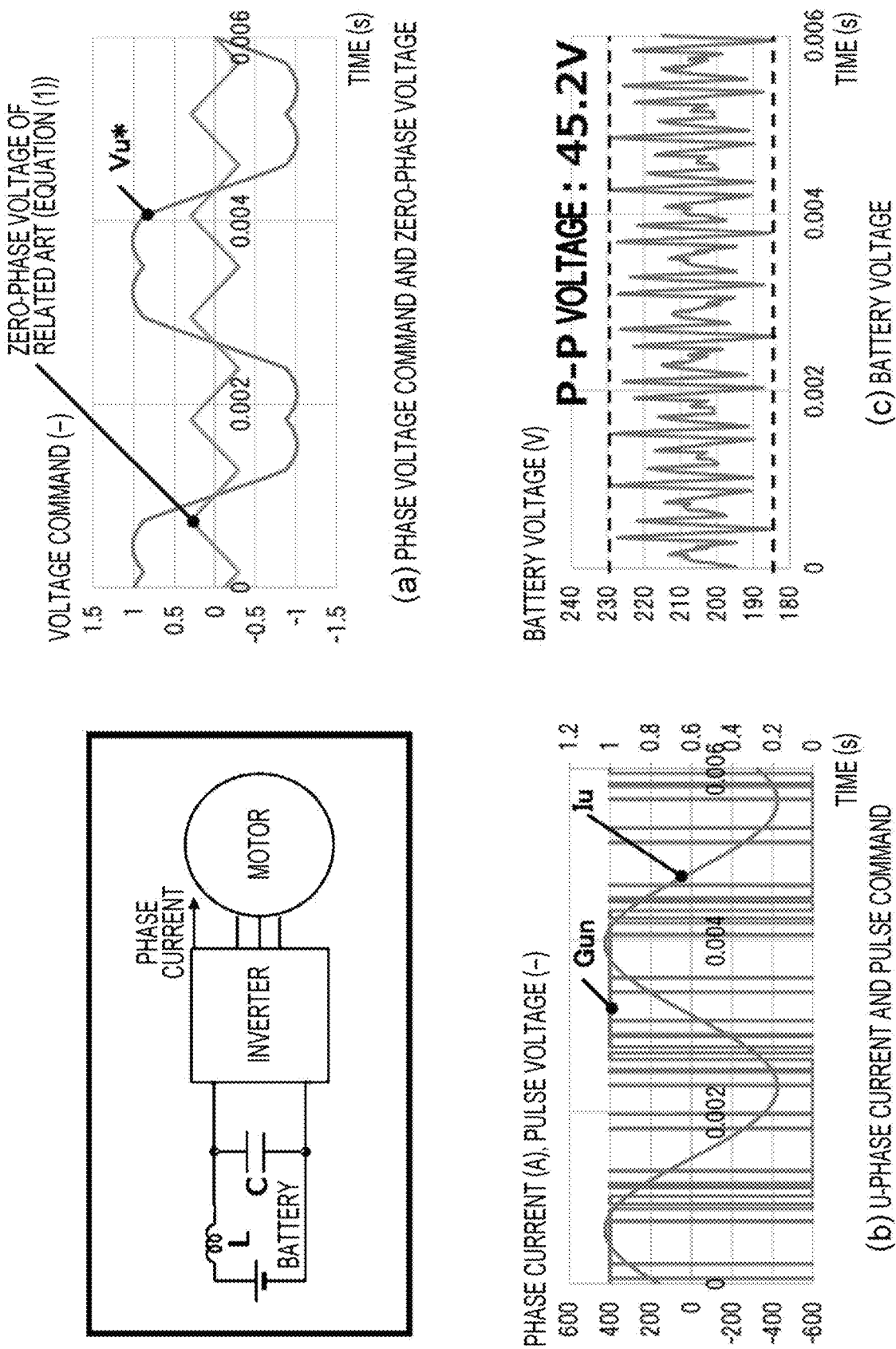
FIG. 7 is a diagram illustrating a simulation result in the case of outputting a three-phase voltage command on which a zero-phase voltage is superimposed in the related art.
Figure 8:
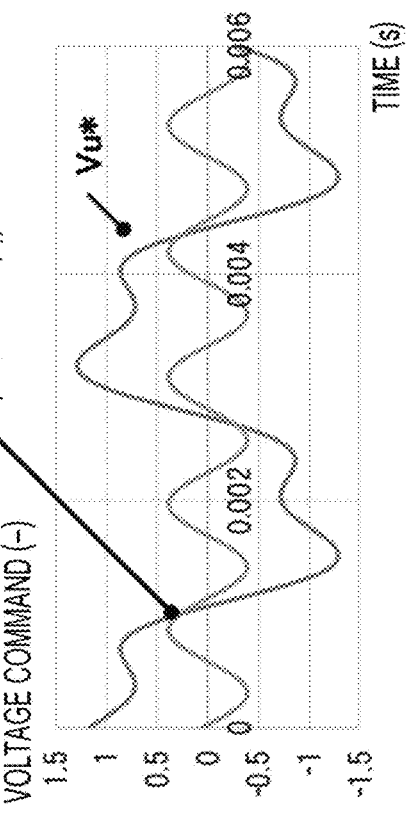
FIG. 8 is a diagram illustrating a simulation result in a case where a three-phase voltage command on which a zero-phase voltage according to a power factor is superimposed is output.
Figure 8:
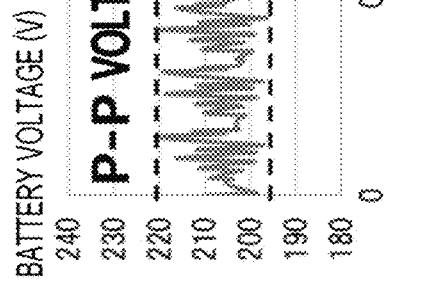
Figure 8:
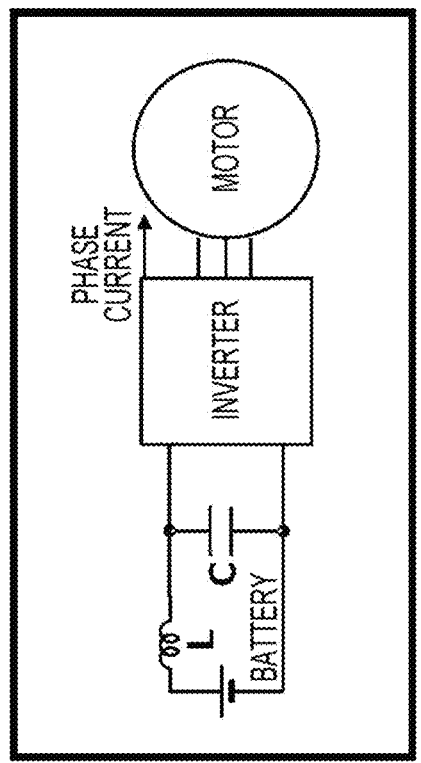
Figure 8:
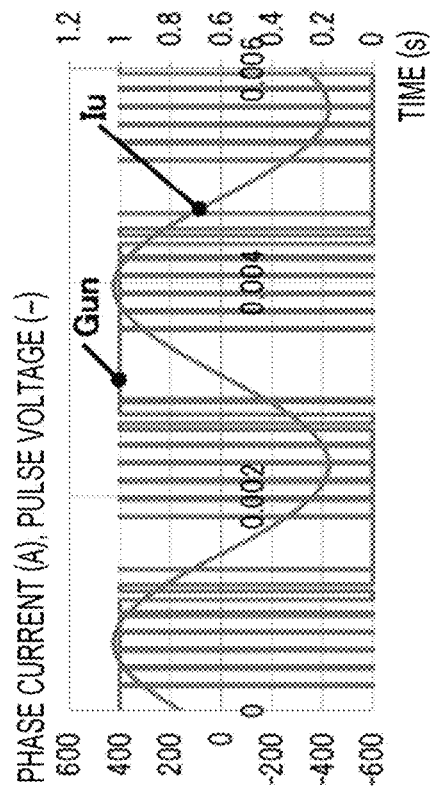

FIG. 7 is a diagram illustrating a simulation result when the first three-phase voltage commands Vu*1, Vv*1, and Vw*1 on which the zero-phase voltage is superimposed according to the method of the related art are output as the three-phase voltage commands Vu*, Vv*, and Vw* in the overmodulation region (modulation factor 1.2). FIG. 8 is a diagram illustrating a simulation result when the second three-phase voltage commands Vu*2, Vv*2, and Vw*2 on which the zero-phase voltage V0 according to the power factor is superimposed are output as the three-phase voltage commands Vu*, Vv*, and Vw* in the overmodulation region (modulation factor 1.2). In FIGS. 7 and 8, (a) illustrates the U-phase voltage command Vu* and a zero-phase voltage, (b) illustrates the U-phase current Iu and the U-phase pulse command (the gate signal Gun), and (c) illustrates a battery voltage applied from the high-voltage battery 5 to the inverter 3.

When FIG. 7(*b*) is compared with FIG. 8(*b*), it can be seen that a larger number of pulse waveforms are included in the U-phase pulse command near the peak of the U-phase current Iu in FIG. 8(*b*) than in FIG. 7(*b*). When FIG. 7(*c*) is compared with FIG. 8(*c*), it can be seen that the fluctuation range (P-P voltage) of the battery voltage decreases by about 40% in FIG. 8(*c*) with respect to FIG. 7(*c*). Therefore, it can be confirmed that, by using the motor control device 1 of the present embodiment, in the pulse command of each phase output as the gate signal from the gate signal generation unit 18, the pulse is concentrated near the peaks of the three-phase currents Iu, Iv, and Iw in the overmodulation region, whereby the DC current ripple can be reduced, and the capacitor voltage ripple can be reduced.

Note that the motor control device 1 of the present embodiment described above can be combined with reduction of the AC voltage performed by changing the ratio (voltage utilization rate) between the DC voltage of the battery or the like and the AC voltage by the application of the negative d-axis current, change of the DC voltage by the DC-DC converter, and the like. As a result, since the embodiment of the present invention can be intentionally used as an overmodulation control region having a modulation factor of 1.15 or more, a greater effect can be obtained. At this time, the various methods for changing the voltage utilization rate described above may be used alone or in combination. Further, when the carrier frequency is improved and the capacitor voltage ripple is reduced, a greater effect can be obtained.

With the motor control device 1 of the present embodiment, since the capacitor voltage ripple in the overmodulation control region with the modulation factor of 1.15 or more can be reduced, the capacitor capacitance required in an environmentally friendly vehicle such as an electric vehicle or a hybrid vehicle can be reduced. As a result, the capacitor volume can be reduced, and the inverter and the electromechanical integrated unit can be downsized. In addition, when the capacitor capacitance is equivalent to the capacitor capacitance in the related art, the switching loss of the inverter can be reduced by reducing the switching frequency of the inverter.

According to the first embodiment of the present invention described above, the following operational effects are achieved.

(1) The motor control device 1 is connected to an inverter 3 that performs power conversion from DC power to AC power and controls driving of the motor 2 that drives by using the AC power and includes the voltage command generation unit 15 that generates the three-phase voltage commands Vu*, Vv*, and Vw* and a gate signal generation unit 18 that performs pulse width modulation on the three-phase voltage commands Vu*, Vv*, and Vw* and generates a gate signal for controlling an operation of the inverter 3. The voltage command generation unit 15 adjusts the three-phase voltage commands Vu*, Vv*, and Vw* by using the zero-phase voltage V0 based on the power factor PF of the AC power in the overmodulation region where the modulation factor H according to the voltage amplitude ratio between the DC power and the AC power exceeds a predetermined threshold value. The gate signal generation unit 18 performs pulse width modulation on the three-phase voltage commands Vu*, Vv*, and Vw* adjusted by the voltage command generation unit 15 to generate a gate signal. With this configuration, in the gate signal generated by the gate signal generation unit 18, the pulses are concentrated near the peaks of the three-phase currents Iu, Iv, and Iw in the overmodulation region, whereby the DC current ripples can be reduced. As a result, it is possible to effectively reduce capacitor voltage ripples while suppressing an increase in capacitor volume and switching loss.

(2) The voltage command generation unit 15 can generate the zero-phase voltage based on the first three-phase voltage commands Vu*1, Vv*1, and Vw*1 before the zero-phase voltage superimposition generated by the dq/three-phase conversion unit 151 and the zero-phase voltage V0 based on the power factor PF in the zero-phase voltage generation unit 152 and the zero-phase voltage correction unit 159, respectively. In the normal region where the modulation factor H is less than the threshold value, the voltage command generation unit 15 outputs the first three-phase voltage commands Vu*1, Vv*1, and Vw*1 adjusted using the zero-phase voltage generated by the zero-phase voltage generation unit 152 as the adjusted three-phase voltage commands Vu*, Vv*, and Vw* by the switching control performed by the switching unit 160. On the other hand, in the overmodulation region where the modulation factor H is the threshold value or more, the voltage command generation unit 15 outputs the second three-phase voltage commands Vu*2, Vv*2, and Vw*2 adjusted using the zero-phase voltage V0 generated by the zero-phase voltage correction unit 159 as the adjusted three-phase voltage commands Vu*, Vv*, and Vw* by the switching control performed by the switching unit 160. Thus, the DC current ripple can be effectively reduced in each of the normal region and the overmodulation region.

(3) The voltage command generation unit 15 generates the zero-phase voltage based on the average value of the maximum phase voltage command and the minimum phase voltage command among the first three-phase voltage commands Vu*1, Vv*1, and Vw*1 in the zero-phase voltage generation unit 152. On the other hand, the zero-phase voltage correction unit 159 generates the zero-phase voltage V0 by delaying the third harmonic components of the second three-phase voltage commands Vu*2, Vv*2, and Vw*2 by the phase corresponding to the power factor PF. With this configuration, it is possible to generate a zero-phase voltage suitable for adjusting the three-phase voltage commands Vu*, Vv*, and Vw* in each of the normal region and the overmodulation region.

(4) For example, 1.15 can be set as the threshold value of the modulation factor H used to determine whether the region is the overmodulation region. In this way, the overmodulation region corresponding to the high-speed rotation/high-torque region of the motor 2 can be reliably determined.

Second Embodiment

Next, a second embodiment of the present invention is described with reference to the drawings. In the present embodiment, an example is described in which the voltage of the smoothing capacitor 33 is detected as a capacitor voltage Vc, and the frequency of the triangular wave signal Tr that is a carrier wave is changed when the magnitude of pulsation of the capacitor voltage Vc exceeds a predetermined upper limit value.

Figure 9:
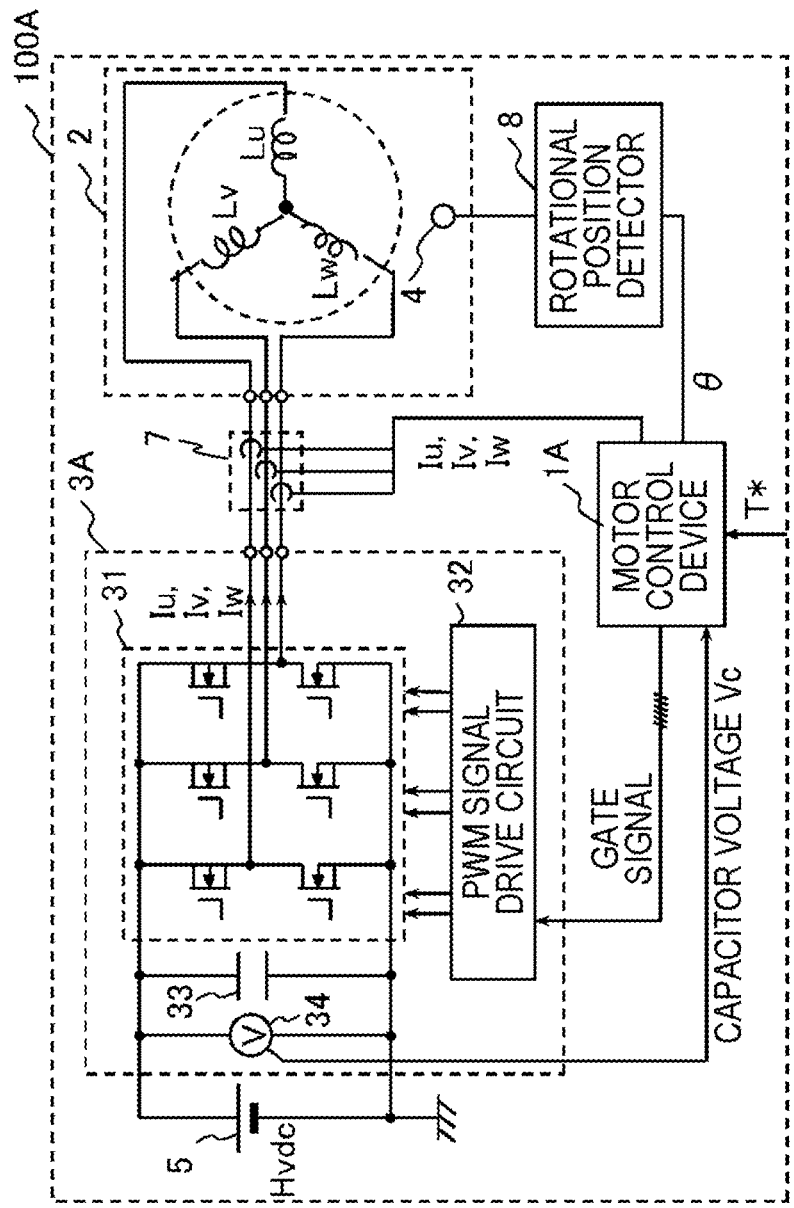
FIG. 9 is an overall configuration diagram of a motor drive system including a motor control device according to a second embodiment of the present invention.

FIG. 9 is an overall configuration diagram of a motor drive system including a motor control device according to the second embodiment of the present invention. A motor drive system 100A of the present embodiment illustrated in FIG. 9 is different from the motor drive system 100 of FIG. 1 described in the first embodiment in that a voltage detection unit 34 is provided in parallel with the smoothing capacitor 33 in an inverter 3A, and the capacitor voltage Vc detected by the voltage detection unit 34 is input to a motor control device 1A. Since the other points are similar to those of the first embodiment, the description thereof is omitted below.

The voltage detection unit 34 detects the voltage of the smoothing capacitor 33 at every predetermined detection cycle and outputs the voltage as a capacitor voltage Vc to the motor control device LA. In the motor drive system 100A of the present embodiment, when the capacitor voltage ripple occurs in the smoothing capacitor 33, the capacitor voltage ripple is detected as a fluctuation of the capacitor voltage Vc by the voltage detection unit 34.

Figure 10:
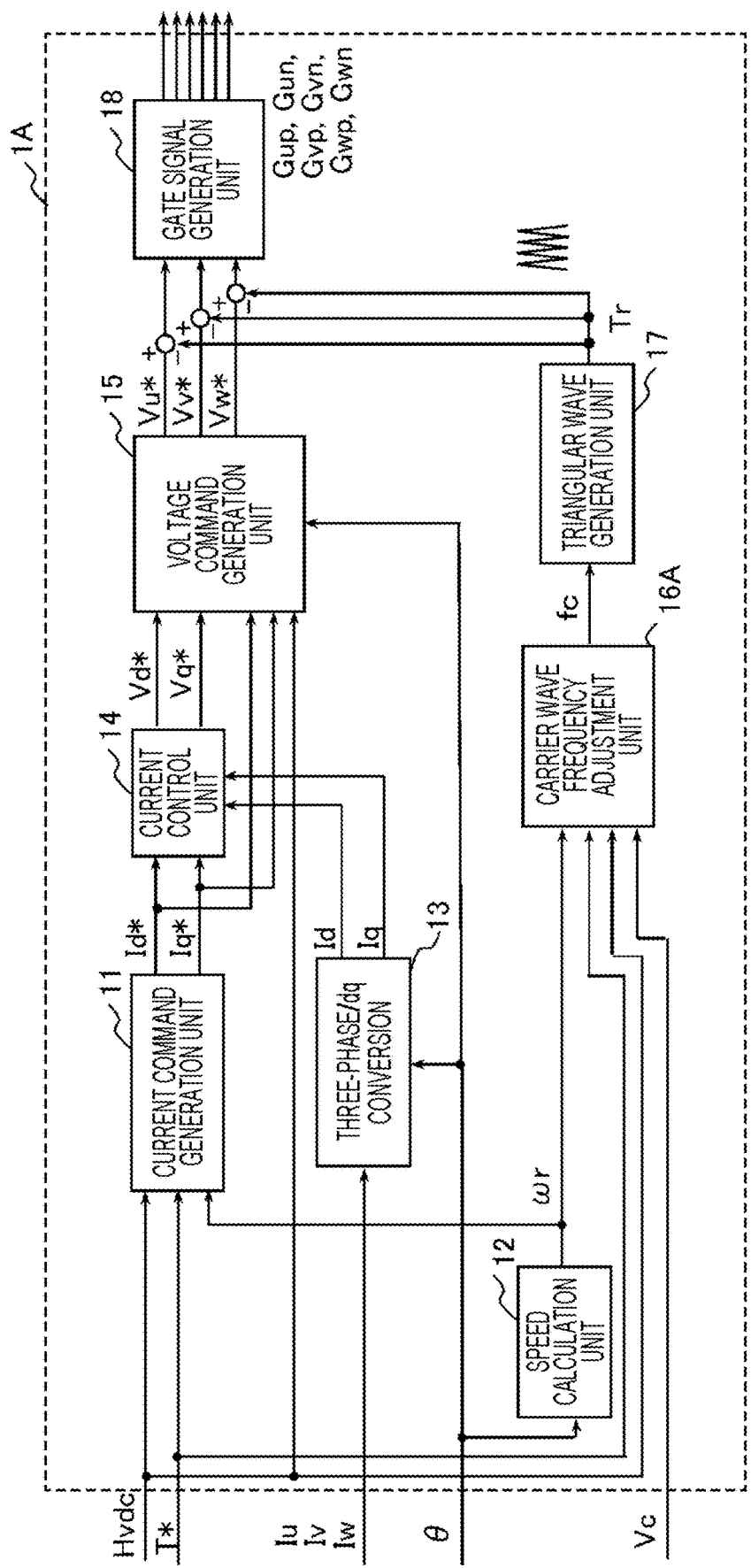
FIG. 10 is a block diagram illustrating a functional configuration of the motor control device according to the second embodiment of the present invention.

FIG. 10 is a block diagram illustrating a functional configuration of the motor control device LA according to the second embodiment of the present invention. The motor control device LA illustrated in FIG. 10 is different from the motor control device 1 of FIG. 2 described in the first embodiment in that a carrier wave frequency adjustment unit 16A is included instead of the carrier wave frequency determination unit 16. Since the other points are the same as those of the first embodiment, the description thereof is omitted below.

Similarly to the carrier wave frequency determination unit 16 in the first embodiment, the carrier wave frequency adjustment unit 16A determines the carrier wave frequency fc representing the frequency of the carrier wave used to generate the gate signal based on the rotational speed ωr, the torque command T*, and the power supply voltage Hvdc obtained by the speed calculation unit 12. At this time, the carrier wave frequency adjustment unit 16A determines whether the capacitor voltage ripple exceeds a predetermined upper limit value based on the capacitor voltage Vc detected by the voltage detection unit 34 in FIG. 9 and changes the carrier wave frequency fc when it is determined that the capacitor voltage ripple exceeds the upper limit value. At this time, it is preferable to change the carrier wave frequency fc so that the carrier wave frequency fc increases in a case where the capacitor voltage ripple exceeds the upper limit value than in a case where the capacitor voltage ripple is less than the upper limit value. For example, the carrier wave frequency fc is increased by increasing the value of the number of synchronous PWM carrier waves Nc. In addition to this, if the carrier wave frequency fc can be increased when the capacitor voltage ripple exceeds the upper limit value, the carrier frequency fc can be changed using any method.

The triangular wave generation unit 17 generates the triangular wave signal (carrier wave signal) Tr for each of the three-phase voltage commands Vu*, Vv*, and Vw* based on the carrier wave frequency fc determined by the carrier wave frequency adjustment unit 16A. As described above, when the carrier wave frequency fc is increased by the carrier wave frequency adjustment unit 16A, the triangular wave signal Tr generated by the triangular wave generation unit 17 is also increased in frequency accordingly.

When the frequency of the triangular wave signal Tr is increased, more pulse waveforms can be generated near the peaks of the three-phase currents Iu, Iv, and Iw in the gate signal generated by the gate signal generation unit 18 by pulse width modulation. Therefore, by combining the processing of the voltage command generation unit 15 described in the first embodiment, that is, the technology of outputting voltages obtained by superimposing the zero-phase voltage V0 according to the power factor on the second three-phase voltage commands Vu*2, Vv*2, and Vw*2 as the three-phase voltage commands Vu*, Vv*, and Vw*, it is possible to further reduce the DC current ripple in the overmodulation region and reduce the capacitor voltage ripple.

According to the second embodiment of the present invention described above, the motor control device LA includes the triangular wave generation unit 17 that generates the triangular wave signal Tr that is a carrier wave and the carrier wave frequency adjustment unit 16A that adjusts the carrier wave frequency fc representing the frequency of the triangular wave signal Tr. The gate signal generation unit 18 generates a gate signal by performing pulse width modulation on the three-phase voltage commands Vu*, Vv*, and Vw* by using the triangular wave signal Tr. The carrier wave frequency adjustment unit 16A changes the carrier wave frequency fc when the magnitude of the voltage pulsation of the smoothing capacitor 33 connected to the inverter 3A in parallel with the high-voltage battery 5 that supplies the DC power exceeds a predetermined upper limit value. With this configuration, the capacitor voltage ripple in the overmodulation region can be further reduced.

Third Embodiment

Next, a third embodiment of the present invention is described with reference to the drawings. In the present embodiment, as in the second embodiment, an example is described in which the voltage of the smoothing capacitor 33 is detected as the capacitor voltage Vc, and the d-axis current is energized to the motor 2 when the magnitude of the pulsation of the capacitor voltage Vc exceeds a predetermined upper limit value. Note that the configuration of the motor drive system in the present embodiment is the same as that of the second embodiment except for the motor control device 1A. Therefore, the present embodiment is described below by using the configuration of the motor drive system 100A described in the second embodiment.

Figure 11:
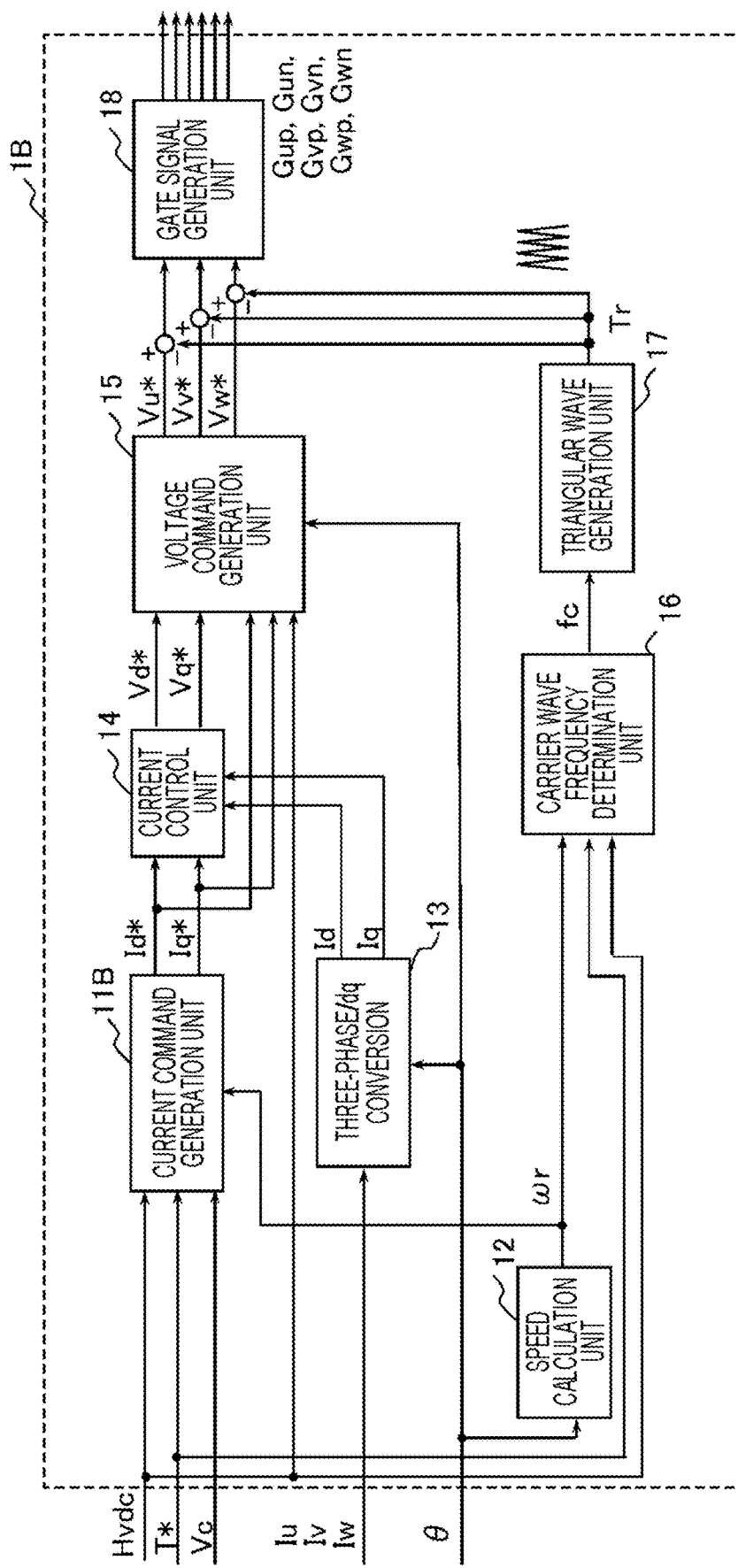
FIG. 11 is a block diagram illustrating a functional configuration of a motor control device according to a third embodiment of the present invention.

FIG. 11 is a block diagram illustrating a functional configuration of a motor control device 1B according to a third embodiment of the present invention. A motor control device 1B illustrated in FIG. 11 is different from the motor control device 1A of FIG. 10 described in the second embodiment in that a current command generation unit 11B is included instead of the current command generation unit 11 and the carrier wave frequency determination unit 16 is included instead of the carrier wave frequency adjustment unit 16A. Since the other points are the same as those of the second embodiment, the description thereof is omitted below.

The current command generation unit 11B calculates the d-axis current command Id* and the q-axis current command Iq* based on the torque command T* and the power supply voltage Hvdc similarly to the current command generation unit 11 in the first embodiment. At that time, the current command generation unit 11B determines whether the capacitor voltage ripple exceeds a predetermined upper limit value based on the capacitor voltage Vc detected by the voltage detection unit 34 in FIG. 9 and changes the AC voltage output from the inverter 3 without changing the output torque of the motor 2 by energization of the d-axis current (weak field current) Id, when it is determined that the capacitor voltage ripple exceeds the upper limit value. At this time, it is preferable to set the d-axis current command Id* and the q-axis current command Iq* so that the voltage absolute value $|V|(=\sqrt{(Vd^2+Vq^2)})$ with respect to the output torque of the motor 2 falls within a predetermined voltage range.

Specifically, the current command generation unit 11B determines a combination of the d-axis current command Id* and the q-axis current command Iq* corresponding to the torque command 1*, for example, according to Equation (10) below. At that time, a combination of the d-axis current command Id* and the q-axis current command Iq* is determined so that the voltage absolute value |V| corresponding to these current commands falls within a predetermined range. Accordingly, a current operating point used in the present embodiment is derived.

$$T=p^*Ke^*Iq+p^*(Ld-Lq)^*Id^*Iq \qquad (10)$$

Here, Id and Iq are dq-axis currents, Ld and Lq are dq-axis inductances, p is pole pairs, and Ke is an induced voltage constant.

As described above, in the motor control device 1B of the present embodiment, in the current command generation unit 11B, the d-axis interference voltage ω* Ld*Id increases due to the energization of the d-axis current (weak field current) Id, and accordingly the q-axis voltage Vq decreases, so that the voltage absolute value IVI can be made to fall within the predetermined range. Therefore, the AC voltage output from the inverter 3A is changed without changing the output torque of the motor 2, and the voltage absolute value IVI is adjusted to fall within a predetermined range, so that an overmodulation control region having a modulation factor of 1.15 or more can be intentionally obtained. Therefore, it is possible to reduce the capacitor voltage ripples by positively utilizing the processing of the voltage command generation unit 15 described in the first embodiment, that is, the technology of outputting voltages obtained by superimposing the zero-phase voltage V0 according to the power factor on the second three-phase voltage commands Vu*2, Vv*2, and Vw*2 as the three-phase voltage commands Vu*, Vv*, and Vw*.

Since the operation of the carrier wave frequency determination unit 16 in the motor control device 1B is similar to that of the first embodiment, the description thereof is omitted.

According to the third embodiment of the present invention described above, the motor control device 1B includes the current command generation unit 11B that generates the d-axis current command Id* and the q-axis current command Iq* according to the torque command and the current control unit 14 that calculates the d-axis voltage command Vd* and the q-axis voltage command Vq* based on the d-axis current command Id* and the q-axis current command Iq*. The voltage command generation unit 15 generates the three-phase voltage commands Vu*, Vv*, and Vw* by converting the d-axis voltage command Vd* and the q-axis voltage command Vq* into the three-phase voltage commands Vu*, Vv*, and Vw*. The current command generation unit 11B generates the d-axis current command Id* and the q-axis current command Iq* so that the d-axis current is conducted in the motor 2 when the magnitude of the voltage pulsation of the smoothing capacitor 33 connected to the inverter 3A in parallel with the high-voltage battery 5 that supplies the power supply voltage Hvdc that is DC power exceeds a predetermined upper limit value. With this configuration, the capacitor voltage ripple can be further reduced by actively utilizing the control in the overmodulation region.

Fourth Embodiment

Next, a fourth embodiment of the present invention is described with reference to the drawings.

Figure 12:
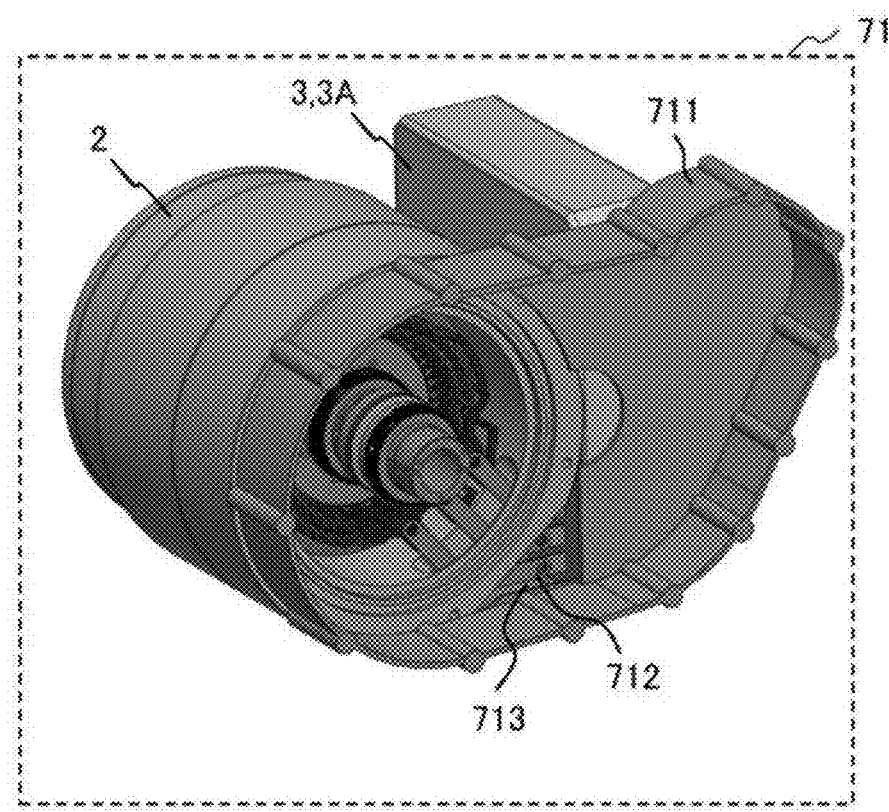
FIG. 12 is an external perspective view of an electromechanical integrated unit according to a fourth embodiment of the present invention.

FIG. 12 is an external perspective view of an electromechanical integrated unit 71 according to the fourth embodiment of the present invention.

The electromechanical integrated unit 71 includes the motor drive systems 100 and 100A (the motor control devices 1, 1A, and 1B, the motor 2, and the inverters 3 and 3A) described in the first to third embodiments. The motor 2 and the inverters 3 and 3A are connected by a coupling portion 713 via a bus bar 712. The output of the motor 2 is transmitted to a differential gear (not illustrated) via a gear 711 and is transmitted to an axle. Although the motor control devices 1, 1A, and 1B are not illustrated in FIG. 12, the motor control devices 1, 1A, and 1B can be arranged at any positions.

The feature of the electromechanical integrated unit 71 is a structure in which the motor 2, the inverters 3 and 3A, and the gear 711 are integrated. The electromechanical integrated unit 71 is required to be downsized, and thus the smoothing capacitor 33 that occupies a large volume among the main components of the inverters 3 and 3A is required to be downsized. By controlling driving of the inverters 3 and 3A by using the motor control devices 1, 1A, and 1B described in the first to third embodiments, capacitor voltage ripples can be reduced. Therefore, the smoothing capacitor 33 can be downsized, and a small electromechanical integrated unit can be realized.

Fifth Embodiment

Next, a fifth embodiment of the present invention is described with reference to the drawings.

Figure 13:
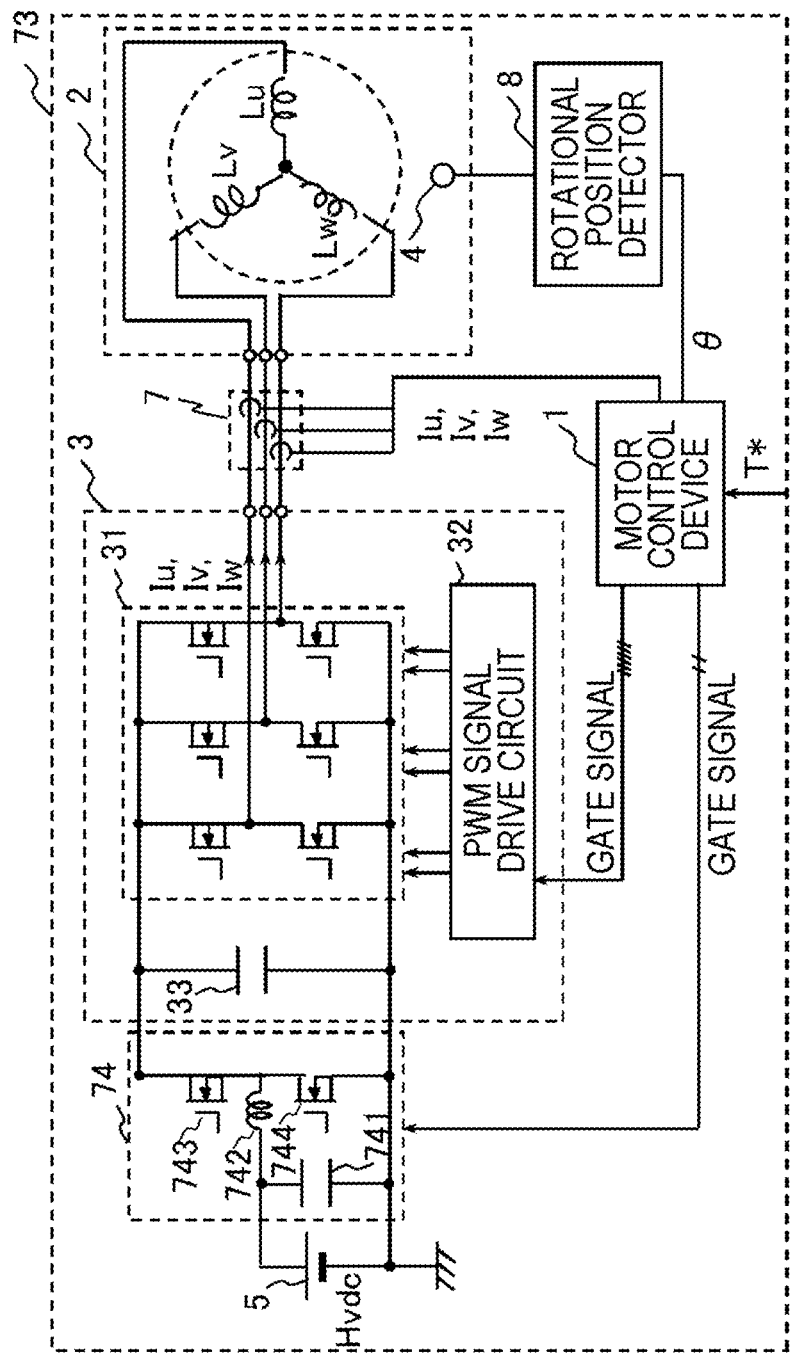
FIG. 13 is a configuration diagram of a boost converter system according to a fifth embodiment of the present invention.

FIG. 13 is a configuration diagram of a boost converter system 73 according to the fifth embodiment of the present invention.

As illustrated in FIG. 13, the boost converter system 73 includes the motor control device 1, the motor 2, the inverter 3, the high-voltage battery 5, the current detection unit 7, and the rotational position detector 8 described in the first embodiment, and a boost converter 74 boosts the DC voltage of the high-voltage battery 5 to a desired voltage and supplies the voltage to the inverter 3. The motor control devices 1A and 1B described in the second and third embodiments may be used instead of the motor control device 1.

In the boost converter 74, the switching elements 743 and 744 are connected in series, and the high-voltage battery 5 is connected to an intermediate connection point of the switching elements 743 and 744 connected in series via a reactor 742. Also, a capacitor 741 is connected in parallel with the high-voltage battery 5. Each of the switching elements 743 and 744 is diode-connected.

The boost converter 74 is given a command by the motor control device 1 and boosted to the most efficient DC voltage of the boost converter system 73. The switching elements 743 and 744 each perform a switching operation to boost the DC voltage supplied from the high-voltage battery 5 to the most efficient DC voltage of the boost converter system 73. As a result, DC power boosted from the DC power of the high-voltage battery 5 is generated and supplied to the inverter 3. The inverter 3 operates based on a gate signal output from the motor control device 1 and performs power conversion from DC power boosted by the boost converter 74 to AC power.

In the present embodiment, when the DC voltage is boosted by the boost converter 74, if the modulation factor determined by the ratio between the DC voltage and the AC voltage exceeds 1.15, the capacitor voltage ripple increases. Therefore, in general, the capacitor capacitance of the smoothing capacitor 33 is often secured in anticipation of a case where the modulation factor exceeds 1.15. However, in the present embodiment, by controlling the driving of the inverter 3 by using the motor control device 1 described in the first embodiment, the capacitor voltage ripple can be reduced even when the modulation factor exceeds 1.15. Therefore, the smoothing capacitor 33 can be downsized.

According to the present embodiment, since the capacitor voltage ripple can be reduced, the electrostatic capacitance of the smoothing capacitor 33 can be reduced, and the boost converter system can be downsized. In the present embodiment, it is described that the DC voltage is changed by using the boost converter 74, but a similar effect can be obtained by DC voltage generation using a generator.

Sixth Embodiment

Next, a sixth embodiment of the present invention is described with reference to the drawings.

Figure 14:
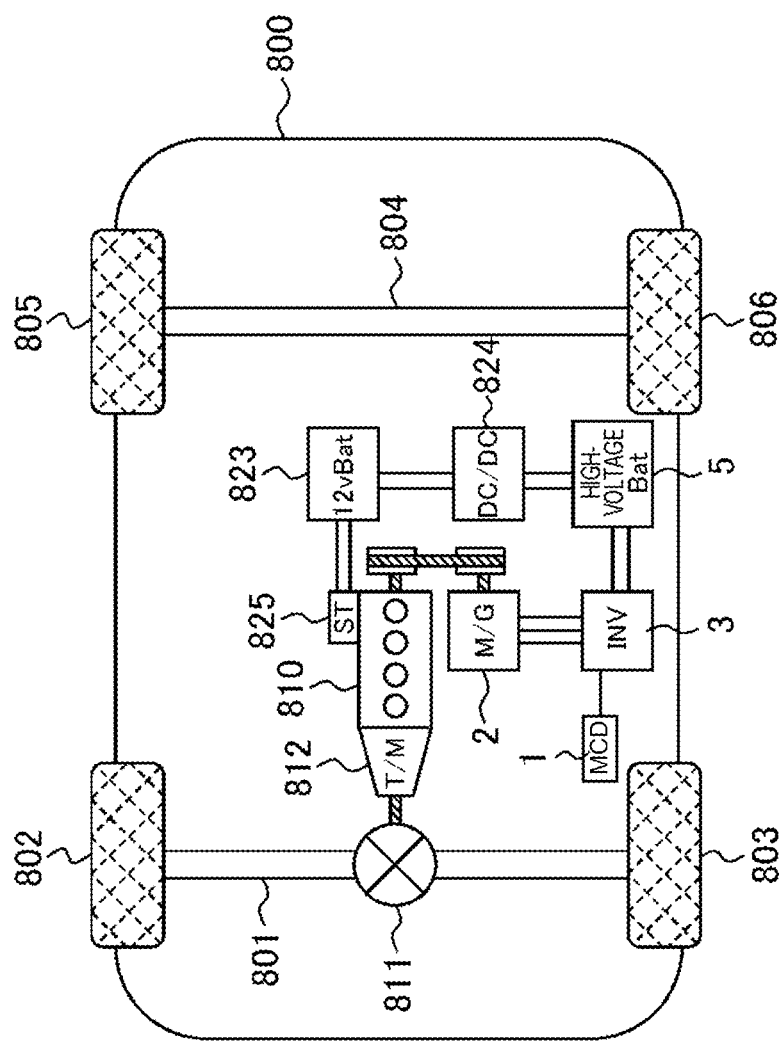
FIG. 14 is a configuration diagram of a hybrid vehicle system according to a sixth embodiment of the present invention.

FIG. 14 is a configuration diagram of a hybrid vehicle system according to the sixth embodiment of the present invention. As illustrated in FIG. 14, the hybrid vehicle system has a power train in which the motor 2 is applied as a motor/generator and travels using the rotational driving force of the motor 2. Note that the present embodiment is not limited to the hybrid vehicle system and may be an electric vehicle system. The motor 2, the inverter 3, the high-voltage battery 5, and the like are similar to those of the motor drive system 100 in the first embodiment.

In the hybrid vehicle system illustrated in FIG. 14, a front wheel axle 801 is rotatably supported on the front portion of a vehicle body 800, and front wheels 802 and 803 are provided at both ends of the front wheel axle 801. A rear wheel axle 804 is rotatably supported on a rear portion of the vehicle body 800, and rear wheels 805 and 806 are provided at both ends of the rear wheel axle 804.

A differential gear 811 which is a power distribution mechanism is provided in a central portion of the front wheel axle 801, and the rotational driving force transmitted from an engine 810 via a transmission 812 is distributed to the left and right front wheel axles 801.

A pulley provided on a crankshaft of the engine 810 and a pulley provided on a rotation shaft of the motor 2 are mechanically connected via a belt. As a result, the rotational driving force of the motor 2 can be transmitted to the engine 810, and the rotational driving force of the engine 810 can be transmitted to the motor 2. In the motor 2, the three-phase AC power output from the inverter 3 is supplied to the coil of the stator in accordance with the control of the motor control device 1, whereby the rotor rotates, and a rotational driving force corresponding to the three-phase AC power is generated.

That is, while the motor 2 is controlled by the inverter 3 according to the control of the motor control device 1 to operate as an electric motor, the rotor rotates by receiving the rotational driving force of the engine 810, to induce electromotive force in the stator coil of the stator and operate the motor 2 as a generator that generates three-phase AC power.

The inverter 3 is a power conversion device that converts DC power supplied from the high-voltage battery 5, which is a high-voltage (42 V or 300 V) system power supply, into three-phase AC power and controls a three-phase AC current flowing through the stator coil of the motor 2 according to the operation command value and the magnetic pole position of the rotor.

The three-phase AC power generated by the motor 2 is converted into DC power by the inverter 3 to charge the high-voltage battery 5. The high-voltage battery 5 is electrically connected to a low-voltage battery 823 via a DC-DC converter 824. The low-voltage battery 823 configures a low voltage (14 V) system power supply of an automobile and is used as a power supply for a starter 825 for initially starting (cold starting) the engine 810, a radio, lights, and the like.

When the vehicle is at a stop such as waiting for a traffic light (idle stop mode), the engine 810 is stopped, and when the engine 810 is restarted (hot start) at the time of re-departure, the motor 2 is driven by the inverter 3 to restart the engine 810. Further, in the idle stop mode, when the amount of charge of the high-voltage battery 5 is insufficient or when the engine 810 is not sufficiently warmed, the engine 810 is not stopped and continues to be driven. Also, during the idle stop mode, it is necessary to secure a drive source of auxiliary machines using the engine 810 as a drive source, such as a compressor of an air conditioner. In this case, the motor 2 is driven to drive the auxiliary machines.

Even in the acceleration mode or the high load operation mode, the motor 2 is driven to assist the driving of the engine 810. On the other hand, in the charging mode in which the high-voltage battery 5 needs to be charged, the engine 810 causes the motor 2 to generate power to charge the high-voltage battery 5. That is, regeneration is performed at the time of braking, deceleration, or the like of the vehicle.

According to the present embodiment, the hybrid vehicle system of FIG. 14 is realized by using the motor drive system 100 described in the first embodiment. In this hybrid vehicle system, the motor control device 1 generates a gate signal for controlling the driving of the motor 2 by the method described in the first embodiment and outputs the gate signal to the inverter 3. That is, in the overmodulation region with the modulation factor of 1.15 or more, the voltages obtained by superimposing the zero-phase voltage V0 according to the power factor on the second three-phase voltage commands Vu*2, Vv*2, and Vw*2 are output as the three-phase voltage commands Vu*, Vv*, and Vw*, and the gate signals are generated by using the three-phase voltage commands Vu*, Vv*, and Vw*. The motor control devices 1A and 1B described in the second and third embodiments may be used instead of the motor control device 1.

According to the present embodiment, since the capacitor ripples can be reduced, the electrostatic capacitance of the smoothing capacitor 33 can be reduced in the motor drive system 100 used in an environmentally friendly vehicle such as an electric vehicle or a hybrid vehicle, and the motor drive system 100 can be downsized. Therefore, it is possible to realize enlargement of the passenger compartment space and securing of the auxiliary machine space in the vehicle. In addition, when the smoothing capacitor 33 has the same volume as the smoothing capacitor in the related art, the switching loss of the inverter can be reduced by reducing the switching frequency of the inverter 3. As a result, the electric cost performance is improved, and the cruising distance can be extended.

Seventh Embodiment

Next, a seventh embodiment of the present invention is described with reference to the drawings.

Figure 15:
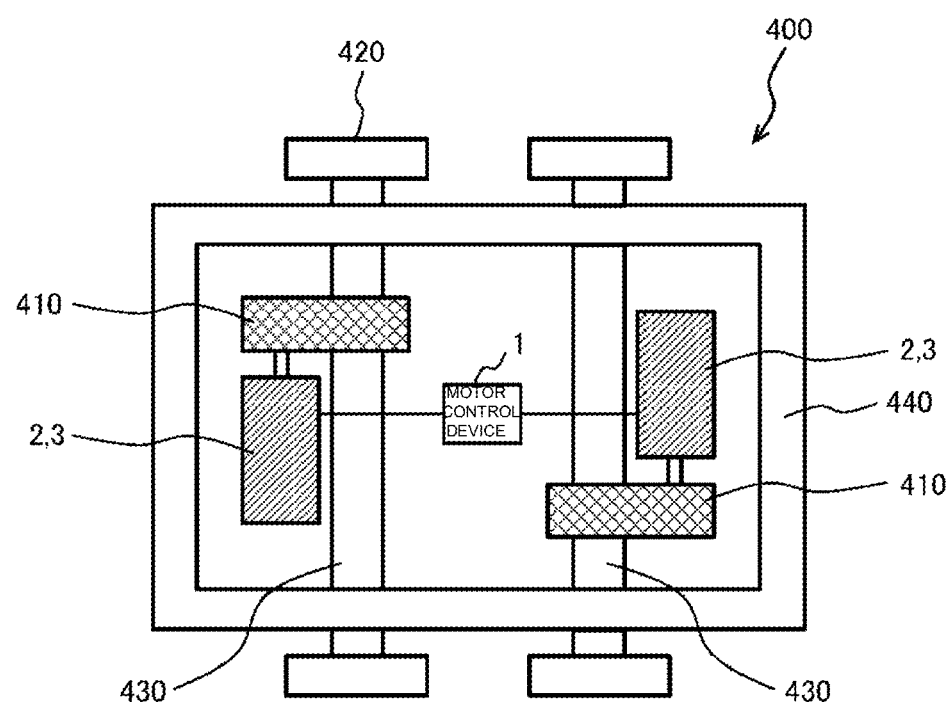
FIG. 15 is a configuration diagram of an electric railway vehicle according to a seventh embodiment of the present invention.

FIG. 15 is a configuration diagram of an electric railway vehicle according to the seventh embodiment of the present invention. As illustrated in FIG. 15, an electric railway vehicle 400 has two axles 430 with wheels 420 attached at both ends, and these axles 430 are pivotally supported by a truck 440. The motor 2 and the inverter 3 are connected to each of the axles 430 via a gear 410. In each motor 2, the three-phase AC power output from the inverter 3 is supplied to the coil of the stator according to the control of the motor control device 1, so that the rotor rotates, and a rotational driving force according to the three-phase AC power is generated and transmitted to the axles 430. As a result, the wheels 420 are driven and the electric railway vehicle 400 travels. In the present embodiment, an example is illustrated in which two motors 2 and two inverters 3 are connected to one motor control device 1, but the combination of the numbers of motor control devices 1, motors 2 and inverters 3 is not limited thereto. For example, the numbers of motors 2 and inverters 3 on the truck 440 may be one or three or more, or the plurality of motors 2 may be controlled by different motor control devices 1, respectively.

From the viewpoint of maintenance saving, many inverters 3 provided in the electric railway vehicle 400 adopt a natural air cooling method or a forced air cooling method. In this case, the switching frequency of the inverter 3 is generally limited to about several hundred Hz to 2 kHz.

In the electric railway vehicle 400, in order to suppress the voltage fluctuation of the overhead line, the capacitor capacitance of the smoothing capacitor 33 in the inverter 3 is about 10 mF, which is larger than that in the in-vehicle application, and thus the smoothing capacitor 33 occupies a large volume in the inverter 3. In addition, as described above, since the inverter 3 is of the air-cooling type, the switching frequency of the inverter 3 is about 500 Hz to 2 kHz, which is smaller than that of in-vehicle use. Therefore, in the inverter 3 mounted on the electric railway vehicle 400, it is difficult to reduce the capacitor capacitance by improving the switching frequency. Meanwhile, in the electric railway vehicle 400 of the present embodiment, by controlling the driving of the inverter 3 by using the motor control device 1 described in the first embodiment, the capacitor voltage ripple can be reduced even when the modulation factor exceeds 1.15. The motor control devices 1A and 1B described in the second and third embodiments may be used instead of the motor control device 1.

According to the present embodiment, since the capacitor voltage ripple can be reduced, the smoothing capacitor 33 can be downsized, and a small and lightweight electric railway vehicle can be provided.

In each of the embodiments described above, each configuration in the motor control devices 1, 1A, and 1B (FIGS. 2, 4, 10, and 11, and the like) may realize the function of each configuration by a CPU and a program, regardless of the configuration by hardware. In a case where each configuration in the motor control devices 1, 1A, and 1B is realized by the CPU and the program, the number of pieces of hardware is reduced, and thus there is an advantage that the cost can be reduced. In addition, this program can be provided by being stored in advance in a storage medium of the motor control device. Alternatively, the program may be stored and provided in an independent storage medium, or the program may be recorded and stored in a storage medium of the motor control device via a network line. Various forms of computer-readable computer program products, such as data signals (carrier waves), may be supplied.

The present invention is not limited to the above embodiments, and other forms conceivable within the scope of the technical idea of the present invention are also included within the scope of the present invention as long as the features of the present invention are not impaired. In addition, a configuration obtained by combining the plurality of embodiments described above may be adopted.

REFERENCE SIGNS LIST 1, 1A, 1B motor control device
2 motor
3, 3A inverter
4 rotational position sensor
5 high-voltage battery
7 current detection unit
8 rotational position detector
11, 11B current command generation unit
12 speed calculation unit
13 three-phase/dq conversion unit
14 current control unit
15 voltage command generation unit
16 carrier wave frequency determination unit
16A carrier wave frequency adjustment unit
17 triangular wave generation unit
18 gate signal generation unit
31 inverter circuit
32 PWM signal drive circuit
33 smoothing capacitor
34 voltage detection unit
71 electromechanical integrated unit
73 boost converter system
74 boost converter
100, 100A motor drive system
151 dq/three-phase conversion unit
152 zero-phase voltage generation unit
153 power factor calculation unit
154 modulation factor calculation unit
155 amplitude/phase calculation unit
156 amplitude/phase correction unit
157 second voltage command calculation unit
158 dq/three-phase conversion unit
159 zero-phase voltage correction unit
160 switching unit
400 electric railway vehicle
410 gear
420 wheel
430 axle
440 truck
711 gear
712 bus bar
713 coupling portion
741 capacitor
742 reactor
743, 744 switching element
800 vehicle body
801 front wheel axle
802 front wheel
803 front wheel
804 rear wheel axle
805 rear wheel
806 rear wheel
810 engine
811 differential gear
812 transmission
823 low-voltage battery
824 DC-DC converter
825 starter

The invention claimed is:

1. A motor control device that is connected to a power converter that performs power conversion from DC power to AC power and controls driving of an AC motor that is driven by using the AC power, the device comprising:
a voltage command generation unit that generates a voltage command; and
a gate signal generation unit that performs pulse width modulation on the voltage command and generates a gate signal for controlling an operation of the power converter, wherein
the voltage command generation unit adjusts the voltage command by using a zero-phase voltage based on a power factor of the AC power in an overmodulation region in which a modulation factor according to a voltage amplitude ratio between the DC power and the AC power exceeds a predetermined threshold value, and
the gate signal generation unit generates the gate signal by performing pulse width modulation on the adjusted voltage command by the voltage command generation unit.

2. The motor control device according to claim 1, wherein
the voltage command generation unit is capable of generating a first zero-phase voltage based on the voltage command and a second zero-phase voltage based on the power factor,
in a normal region where the modulation factor is less than the threshold value, the voltage command generation unit outputs the voltage command adjusted using the first zero-phase voltage as the adjusted voltage command, and
in the overmodulation region, the voltage command generation unit outputs the voltage command adjusted by using the second zero-phase voltage as the adjusted voltage command.

3. The motor control device according to claim 2, wherein
the voltage command is a three-phase voltage command, and the voltage command generation unit generates the first zero-phase voltage based on an average value of a maximum phase voltage command and a minimum phase voltage command among the three-phase voltage commands, and delays a third harmonic component of the three-phase voltage command by a phase corresponding to the power factor to generate the second zero-phase voltage.

4. The motor control device according to claim 1, wherein the threshold value is 1.15.

5. The motor control device according to claim 1, further comprising:
a carrier wave generation unit that generates a carrier wave; and
a carrier wave frequency adjustment unit that adjusts a frequency of the carrier wave, wherein
the gate signal generation unit generates the gate signal by performing pulse width modulation on the voltage command by using the carrier wave, and
the carrier wave frequency adjustment unit changes the frequency of the carrier wave when a magnitude of voltage pulsation of a capacitor connected to the power converter in parallel with a DC power supply that supplies the DC power exceeds a predetermined upper limit value.

6. The motor control device according to claim 1, further comprising:
a current command generation unit that generates a d-axis current command and a q-axis current command according to a torque command; and
a current control unit that calculates a d-axis voltage command and a q-axis voltage command based on the d-axis current command and the q-axis current command, wherein
the voltage command generation unit generates the voltage command by converting the d-axis voltage command and the q-axis voltage command into a three-phase voltage command, and
the current command generation unit generates the d-axis current command and the q-axis current command so that a d-axis current is energized in the AC motor when a magnitude of voltage pulsation of a capacitor connected to the power converter in parallel with a DC power supply that supplies the DC power exceeds a predetermined upper limit value.

7. An electromechanical integrated unit comprising:
the motor control device according to claim 1;
the power converter that is connected to the motor control device;
the AC motor that is driven by the power converter; and
a gear that transmits a rotational driving force of the AC motor, wherein the AC motor, the power converter, and the gear are integrated.

8. A boost converter system comprising:
the motor control device according to claim 1;
the power converter that is connected to the motor control device;
the AC motor that is driven by the power converter; and
a boost converter that boosts a voltage of the DC power.

9. An electric vehicle system comprising:
the motor control device according to claim 1;
the power converter that is connected to the motor control device; and
the AC motor that is driven by the power converter, wherein the electric vehicle system travels by using a rotational driving force of the AC motor.

10. A motor control method for controlling an operation of a power converter that performs power conversion from DC power to AC power and controlling driving of an AC motor that is driven by using the AC power, the method comprising:
generating a voltage command;
adjusting the voltage command by using a zero-phase voltage based on a power factor of the AC power in an overmodulation region in which a modulation factor according to a voltage amplitude ratio between the DC power and the AC power exceeds a predetermined threshold value; and
generating a gate signal for controlling an operation of the power converter by performing pulse width modulation on the adjusted voltage command.

11. The motor control method according to claim 10, comprising:
outputting, as the adjusted voltage command, the voltage command adjusted using the first zero-phase voltage based on the voltage command in a normal region where the modulation factor is less than the threshold value; and
outputting, as the adjusted voltage command, the voltage command adjusted by using the second zero-phase voltage based on the power factor in the overmodulation region.

12. The motor control method according to claim 11, wherein
the voltage command is a three-phase voltage command,
the first zero-phase voltage is generated based on an average value of a maximum phase voltage command and a minimum phase voltage command among the three-phase voltage commands, and
a third harmonic component of the three-phase voltage command is delayed by a phase corresponding to the power factor to generate the second zero-phase voltage.

13. The motor control method according to claim 10, wherein the threshold value is 1.15.

14. The motor control method according to claim 10, further comprising:
generating a carrier wave;
generating the gate signal by performing pulse width modulation on the adjusted voltage command by using the carrier wave; and
changing a frequency of the carrier wave when a magnitude of voltage pulsation of a capacitor connected to the power converter in parallel with a DC power supply that supplies the DC power exceeds a predetermined upper limit value.

15. The motor control method according to claim 10, further comprising:
generating a d-axis current command and a q-axis current command according to a torque command;
calculating a d-axis voltage command and a q-axis voltage command based on the d-axis current command and the q-axis current command;
generating the voltage command by converting the d-axis voltage command and the q-axis voltage command into a three-phase voltage command; and
generating the d-axis current command and the q-axis current command so that a d-axis current is energized in the AC motor when a magnitude of voltage pulsation of a capacitor connected to the power converter in parallel with a DC power supply that supplies the DC power exceeds a predetermined upper limit value.

* * * * *